United States Patent
Lahat

(10) Patent No.: US 6,963,561 B1
(45) Date of Patent: Nov. 8, 2005

(54) FACILITY FOR TRANSPORTING TDM STREAMS OVER AN ASYNCHRONOUS ETHERNET NETWORK USING INTERNET PROTOCOL

(75) Inventor: Amir Lahat, Kibbutz Givat-Brenner (IL)

(73) Assignee: Atrica Israel Ltd., Herzelia (IL)

(*) Notice: Subject to any disclaimer, the term of this patent is extended or adjusted under 35 U.S.C. 154(b) by 879 days.

(21) Appl. No.: 09/738,597

(22) Filed: Dec. 15, 2000

(51) Int. Cl.[7] .......................................... H04L 12/66
(52) U.S. Cl. ................... 370/356; 370/466; 370/474; 370/401
(58) Field of Search ............... 370/401, 466, 370/474, 352, 465, 537, 356

(56) References Cited

U.S. PATENT DOCUMENTS

| | | | |
|---|---|---|---|
| 5,459,720 A * | 10/1995 | Iliev et al. .................. | 370/393 |
| 5,892,768 A * | 4/1999 | Jeng ............................ | 370/445 |
| 6,240,084 B1 * | 5/2001 | Oran et al. .................. | 370/352 |
| 6,304,574 B1 * | 10/2001 | Schoo et al. ................ | 370/401 |
| 6,459,708 B1 * | 10/2002 | Cox et al. ................... | 370/537 |
| 6,603,759 B1 * | 8/2003 | Moskal et al. .............. | 370/352 |
| 6,674,750 B1 * | 1/2004 | Castellano .................. | 370/354 |
| 6,731,649 B1 * | 5/2004 | Silverman ................... | 370/466 |
| 6,754,201 B1 * | 6/2004 | Griffin et al. ............... | 370/352 |
| 6,771,671 B1 * | 8/2004 | Fields et al. ................ | 370/514 |

OTHER PUBLICATIONS

IP Tube T1 Product Brochure, Engage Communication, Not dated.
Stein, Y. et al., "Circuit Extension Over IP", RAD Data Communications, http://www.tdmoio.com/wp_ceoip.htm, pp. 1-13, Not dated.

* cited by examiner

Primary Examiner—Ricky Ngo
Assistant Examiner—Nittaya Juntima
(74) Attorney, Agent, or Firm—Zaretsky & Associates PC; Howard Zaretsky

(57) ABSTRACT

A transport facility adapted to transport TDM bit streams using IP packets over an asynchronous Ethernet network. TDM bit streams such as E1, T1, E3, T3, OC-3, OC-12, STM-1, STM-4, etc. are received, buffered and encapsulated into Ethernet frames. The Circuit Emulation Device (CED) receives, buffers and assembles in real-time ingress data from TDM ports into Ethernet Frames and forwards them to an Ethernet interface. The TDM data is encapsulated within RTP, UDP and IP packets before being encapsulated within an Ethernet frame. In the egress direction, Ethernet frames enter the encapsulation/segmentation processor from the Ethernet port and the IP, UDP and RTP packets are extracted from the frame. TDM data is extracted and the bit streams are re-generated and forwarded to the TDM ports for transmission over legacy TDM facilities.

47 Claims, 15 Drawing Sheets

FACILITY FOR TRANSPORTING TDM STREAMS OVER AN ASYNCHRONOUS ETHERNET NETWORK USING INTERNET PROTOCOL

FIELD OF THE INVENTION

The present invention relates generally to data communications and more particularly relates to a facility transport system for transporting Time Division Multiplexing (TDM) bit stream data over asynchronous Ethernet networks using the Internet Protocol (IP).

BACKGROUND OF THE INVENTION

Currently, the number of data networks and the volume of traffic these networks carry are increasing at an ever faster rate. The network devices making up these networks generally consist of specialized hardware designed to move data at very high speeds. Typical networks, such as Ethernet based networks, are mainly comprised of end stations, Ethernet hubs, switches, routers, bridges and gateways. ATM networks are constructed with similar network devices adapted to carry ATM traffic, e.g., ATM capable end stations, edge devices and ATM switches.

Voice traffic, on the other hand, is handled by networks comprised of different types of equipment. Currently, the topology of the telecommunications telephony network constitutes a combination of two main elements: switching products and transmission products. Switching products are defined within sets of hierarchies and include, for example, Class-X switches such as Class-4 and Class-5 switches. The lowest level in the hierarchy is the Class-5 switch (e.g., Lucent ESS-5) which is connected on the user side to either home telephones or Private Branch Exchanges (PBXs) within enterprises. On the network side, the Class-5 switch is connected via transmission equipment to a Class-4 switch. Class-4 switches are higher in the hierarchy and are connected to Class-3 switches through transmission equipment.

The transmission products are divided into two families: (1) Time Division Multiplexing (TDM) over Synchronous Optical Network (SONET)/Synchronous Data Hierarchy (SDH) networks and (2) TDM over Asynchronous Transfer Mode (ATM) over SONET/SDH networks. These two types of transmission families provide transportation layer functionality with different capabilities.

There currently exist several common topologies for these types of transmission products.
1. Point to point: In a point-to-point connection, two switches are directly connected via a transmission line.
2. Chain: In a chain connection, multiple Add Drop Multiplexers (ADMs) are connected in serial fashion. One application of a chain network is dropping Primary Rate Interfaces (PRIs) at several serial points.
3. Ring: In a ring network topology, multiple switches are connected using multiple ADMs connected in a ring formation. Applications of a ring network include Metropolitan Area Networks (MANs) and Wide Area Networks (WANs).
4. Star: In a start network topology, multiple switches are connected to a main switch via a plurality of ADMs and a main ADM.

The ring and star network topologies are the most common. Examples of these two topologies are presented below.

A block diagram illustrating a prior art network having a ring topology wherein multiple ADMs make up the ring is shown in FIG. 1. The network, generally referenced 10, comprises class-5 switches 14, an SDH ring topology network 12 made up of a plurality of ADMs 18, and a class-4 switch 16. The ADM devices 18 in the SDH ring network 12 are connected to each other via optical fiber connections 20, as indicated by the dotted arrows. Each Class-5 switch 14 is connected on the network side to an ADM device 18 via a one or more copper TDM transmission lines (e.g., N×E1 lines) as indicated by the solid arrows. On the user side, the Class-5 switches are connected to telephones 22 via local loop lines 30 or to PBX equipment 24 located in enterprises via E1 transmission facilities 26.

The connection to the upper hierarchy levels is via one of the ADM transmission products which is connected to a Class-5 switch via one or more E1 lines 34, which in turn is connected to a Class-4 switch 16 via one or more E1/E3 or OC-3/OC-12 facilities 32.

Note that in this example and throughout this document, the transmission lines and telco networks shown are intended as examples only. Thus, the E1 lines may be replaced by any other suitable TDM type transmission facility including, but not limited to, T1, T3, E1, E3, OC-3, OC-12, STM-1, STM-4, etc. Similarly, the European SDH network and E1/E3 lines can be replaced with the American SONET and T1/T3 standards.

A block diagram illustrating a prior art network having a star topology wherein a main ADM is connected to a plurality of ADMs is shown in FIG. 2. The network, generally referenced 40, comprises class-5 switches 44, an SDH star topology network 50 made up of a plurality of ADMs 51, and a class-4 switch 42. The ADM devices 51 in the SDH star network 50 are connected to each other via optical fiber connections 52, as indicated by the dotted arrows. Each Class-5 switch 44 is connected on the network side to an ADM device 51 via a one or more copper TDM lines (e.g., N×E1 lines) as indicated by the solid arrows 54. On the user side, the Class-5 switches are connected to telephones 62 via local loop lines 60 or to PBX equipment 56 located in enterprises via E1 transmission facilities 58.

The connection to the upper hierarchy levels is via one of the ADM transmission products which is connected to a Class-5 switch via one or more E1 lines 48, which in turn is connected to a Class-4 switch 42 via one or more E1/E3 facilities 46.

Note that, as described above, the E1 lines may be replaced by any other suitable TDM type transmission facility including T1, T3, E3, etc. Similarly, the European SDH network and E1/E3 lines can be replaced with the American SONET and T1/T3 standards.

A significant disadvantage is that traditionally, transmission products are expensive, particularly in terms of management and maintenance aspects. The main reason for the high costs of management and maintenance of transmission equipment is the lack of flexibility of both the equipment and the topology. In addition, most transmission equipment is characterized by non-trivial configuration and maintenance procedures. This makes networks with large numbers of transmission equipment products difficult to install, configure and maintain requiring skilled crafts that are specially trained to operate and maintain the equipment.

On the other hand, transmission equipment today provides high quality connections utilizing bandwidth reservation. In addition, most equipment has fast fault detection and high fault tolerance capabilities.

Historically, telecommunications companies (i.e. PTTs) provided voice services only. Today, virtually every telecommunication company around the world provides not only voice services but data services as well. Some telcos have been providing both voice and data services for many years already while others are only beginning now. Due to historical reasons, the PTTs that provide data voice services operate two separate networks: one for voice and the other for data. FIGS. 1 and 2 described above, presented examples of voice networks only.

An example of current separate data and voice networks will now be described. A block diagram illustrating a prior art telco network comprising separate voice and data networks are shown in FIG. 3. The network, generally referenced 70, comprises separate voice network 72 and data network 74. The voice network may have any suitable topology such as ring, star etc.

Voice from home telephones 84 is carried by local loop lines to the user side to Class-5 switches 78. In the enterprise 82, voice is handled by PBXs connected to the switch via copper TDM facilities, e.g., E1 lines. The enterprise data connection is through the voice network. A router is connected to the user side of the nearest Class-5 switch via one or more TDM facilities, e.g., E1, T1, etc. Alternatively, the router may have a direct connection 83 to the voice network via optical fiber, e.g., OC-3, through an ADM. In addition, the router may be directly connected to the data network via an optical fiber connection 85 (e.g., OC-3) to an ATM or FR switch connected to the data network.

The network side of the Class-5 switches is connected to ADMs 80 via one or more E1 lines. A connection to upper levels in the hierarchy is made through the Class-4 switch 76 connected to a Class-5 switch via higher capacity E3 transmission lines.

On the data side, as an example, xDSL subscribers are connected to a Digital Subscriber Line Access Multiplexer (DSLAM) 88. In particular, a Small Office/Home Office (SOHO) environment 90 comprises a PBX 94 and a LAN 98 connected to a router 96. The PBX and router are connected to a Network Termination Unit (NTU) 92 which is connected to the DSLAM via copper. Similarly, a home environment comprises a telephone 100 and workstation 102 connected to a NTU 104. The NTU 104 is also coupled to a port in the DSLAM 88 via copper.

The data portion of the signal is separated from the data, using splitters or an equivalent thereto. Data traffic is passed on to a data switch 86 such as ATM or Frame Relay (FR) which is connected to the data network 74. Voice traffic is directed to a Class-5 switch via a TDM transmission facility, e.g., T1, E1, etc. which feeds the voice traffic to the voice network 72.

There is, however, a big disadvantage with the configuration described above. The disadvantage is that the telecommunications company must build, install, operate, maintain and manage two different networks. The equipment used is different for each type of network. Each type of network requires separate specialized switching and transmission facility equipment and the trained craft personnel to build, operate and manage the two networks. The cost to telecommunications companies for building and maintaining two separate networks for voice and data can be enormous. As is the case in most parts of the world, the demand for data services is increasing at a fast rate. This is largely due to the explosive growth of the Internet including the use of the web, email and file transfer. It is also due to more and more work being done electronically in the workplace rather than on paper with the resultant increase in business-to-business data traffic. The demand for voice traffic is also increasing as the number of users of personal communications devices increases. The number of users such devices which comprise, for example, cellular telephones, beepers, etc. is increasing each year. In addition, many third world countries are beginning to modernize their aging communications infrastructures by replacing outdated systems and/ or installing new systems where none previously existed.

Thus, there is a need for a solution that will enable the convergence of both voice and data networks into a single network. This would permit PTTs to provide voice and data services at greatly reduced cost. In addition, a combined network would allow PTTs to provide new services to end users.

SUMMARY OF THE INVENTION

The present invention is a transport facility adapted to transport TDM bit streams using IP packets over an asynchronous Ethernet network. The TDM bit streams are received, buffered and encapsulated into Ethernet frames using the method of the present invention. Using the present invention, TDM streams such as E1, T1, E3, T3, etc. can be transported via Ethernet across an Ethernet cloud using existing transport facilities such as optical fiber.

The individual DS0 time slots are not examined but rather the entire facility is encapsulated into IP packets and transported over the asynchronous Ethernet network. At the destination, the Ethernet frames are segmented and TDM bit streams are re-generated. The TDM bit streams can continue to be transported over existing TDM transport facilities. The invention thus enables converged data and voice networks whereby Network Service Providers (NSPs) can offer additional services for reduced cost.

The apparatus of the present invention is termed a Circuit Emulation Device (CED). A basic function of the CED is to encapsulate multiple TDM streams into an IP packet. At the core of the CED is an encapsulation/segmentation processor which comprises a TDM interface (e.g., digital-X) and an Ethernet interface. The TDM interface is coupled to a plurality of TDM ports, e.g., E1, T1, etc., and adapted to provide a bi-directional interface to a plurality of constant TDM synchronous serial bit streams. The Ethernet interface is connected to one or more Ethernet connections, e.g., Fast Ethernet, Gigabit Ethernet, etc.

In the ingress direction, real-time ingress data from the TDM ports is received, buffered and assembled into Ethernet frames and forwarded to the Ethernet interface. The TDM data is encapsulated within RTP, UDP and IP packets before being encapsulated within an Ethernet frame.

In the egress direction, Ethernet frames enter the encapsulation/segmentation processor from the Ethernet port and the IP, UDP and RTP packets are extracted from the frame. TDM data is extracted and the bit streams are re-generated and forwarded to the TDM ports.

The CED of the present invention has application in the telecommunication carrier transmission market. It is intended to replace the current SDH/SONET technology with IP/Ethernet technology while preserving legacy telephony switches.

The invention provides the benefit to telecommunication companies of preserving current network capabilities and switching equipment while providing a new source for revenues through direct data services in a converged data and voice network.

The CED thus provides an IP based solution that enables the convergence of legacy voice and data networks into one network and allows PTTs to provide new services to end users.

There is therefore provided in accordance with the present invention an apparatus for transporting a plurality of Time Division Multiplexing (TDM) bit streams over an asynchronous Ethernet network comprising an ingress buffer adapted for storing TDM data before encapsulation into Ethernet frames, an egress buffer adapted for storing Ethernet frames after segmentation into TDM streams, encapsulation means operative to retrieve TDM data from the ingress buffer, assemble Ethernet frames therefrom and forward the assembled Ethernet frames to the Ethernet interface, segmentation means operative to receive Ethernet frames from an Ethernet interface, extract TDM data therefrom and store the TDM data in the egress buffer and a processor adapted to receive TDM data from a plurality of TDM ports, store the TDM data in the ingress buffer in accordance with output Ethernet frames, retrieving TDM data from the egress buffer and generating a plurality of synchronous TDM data streams therefrom.

There is also provided in accordance with the present invention an apparatus for transporting TDM bit streams over an Ethernet network comprising a plurality of TDM port interfaces coupled to a plurality of TDM ports, each TDM port adapted to receive a constant synchronous serial or parallel TDM bit stream, at least one Ethernet interface adapted to be coupled to an Ethernet network, encapsulation means operative to retrieve TDM data from an ingress buffer, assemble Ethernet frames therefrom and forward the assembled Ethernet frames to the Ethernet interface, segmentation means operative to receive Ethernet frames from the Ethernet interface, extract TDM data therefrom and store the TDM data in an egress buffer and a processor adapted to receive TDM data from a plurality of TDM ports, store the TDM data in the ingress buffer in accordance with output Ethernet frames, retrieving TDM data from the egress buffer and generating a plurality of TDM data streams therefrom.

There is further provided in accordance with the present invention a method of transporting a plurality of Time Division Multiplexing (TDM) bit streams over an Ethernet network, the method comprising the steps of receiving TDM stream data from a plurality of TDM ports, assembling Ethernet frames from the received TDM stream data, forwarding the assembled Ethernet frames to the Ethernet network via an Ethernet interface connected thereto, receiving Ethernet frames from the Ethernet network, extracting TDM data from the received Ethernet frames and generating TDM streams therefrom and forwarding the TDM streams to an appropriate TDM port in a synchronous manner.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
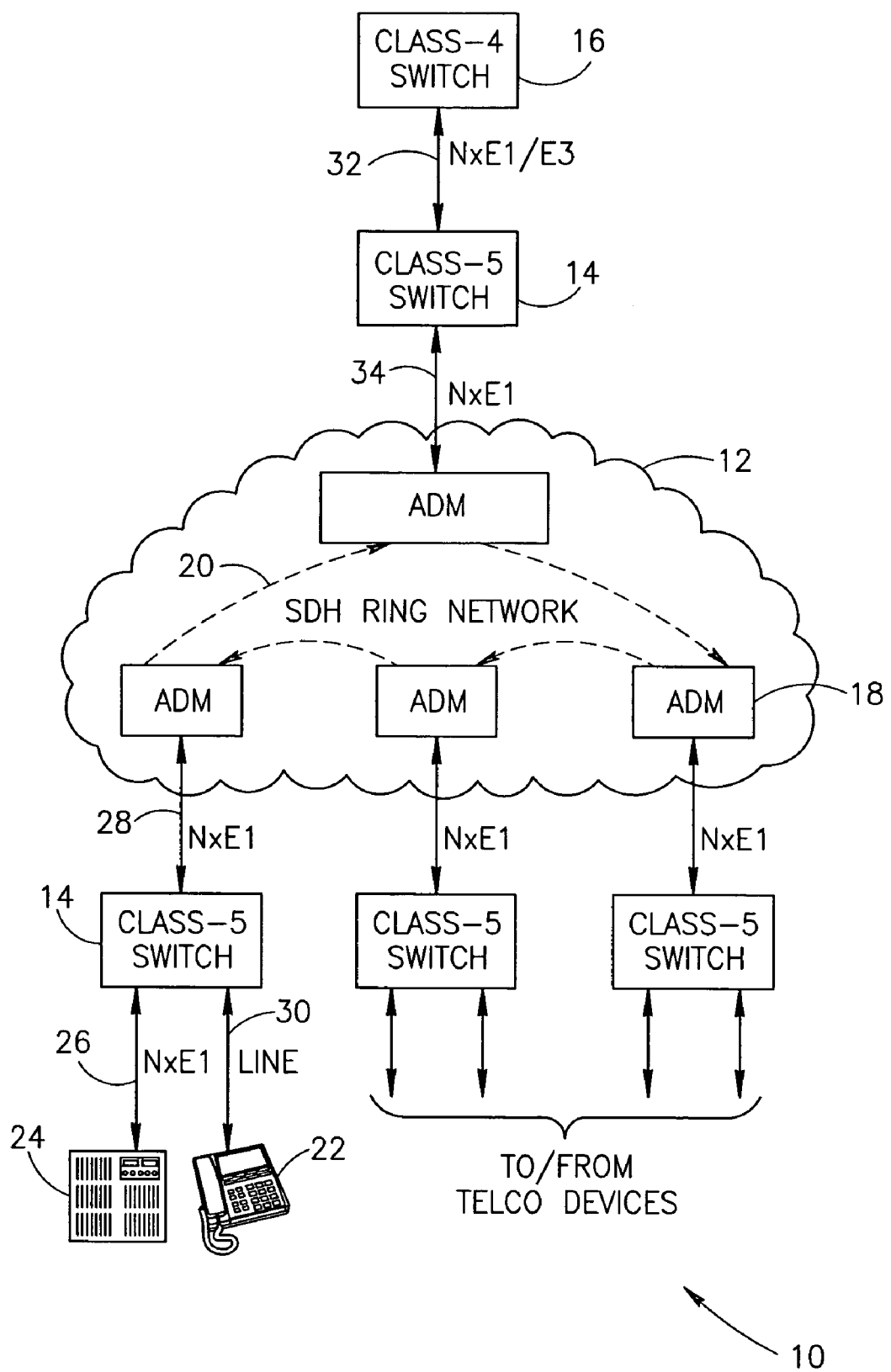
FIG. 1 is a block diagram illustrating a prior art network having a ring topology wherein multiple ADMs make up the ring.
Figure 2:
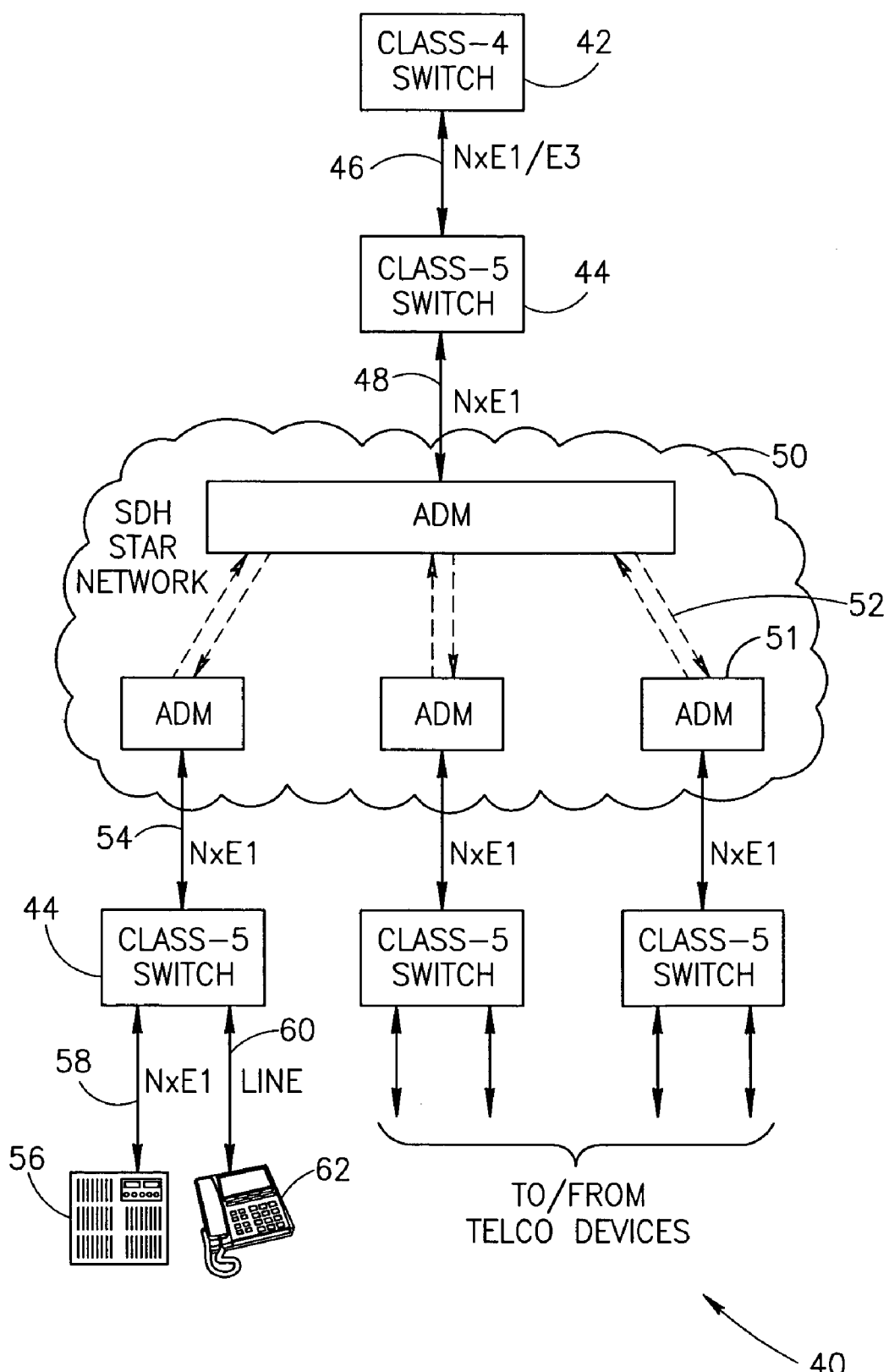
FIG. 2 is a block diagram illustrating a prior art network having a star topology wherein a main ADM is connected to a plurality of ADMs.
Figure 3:
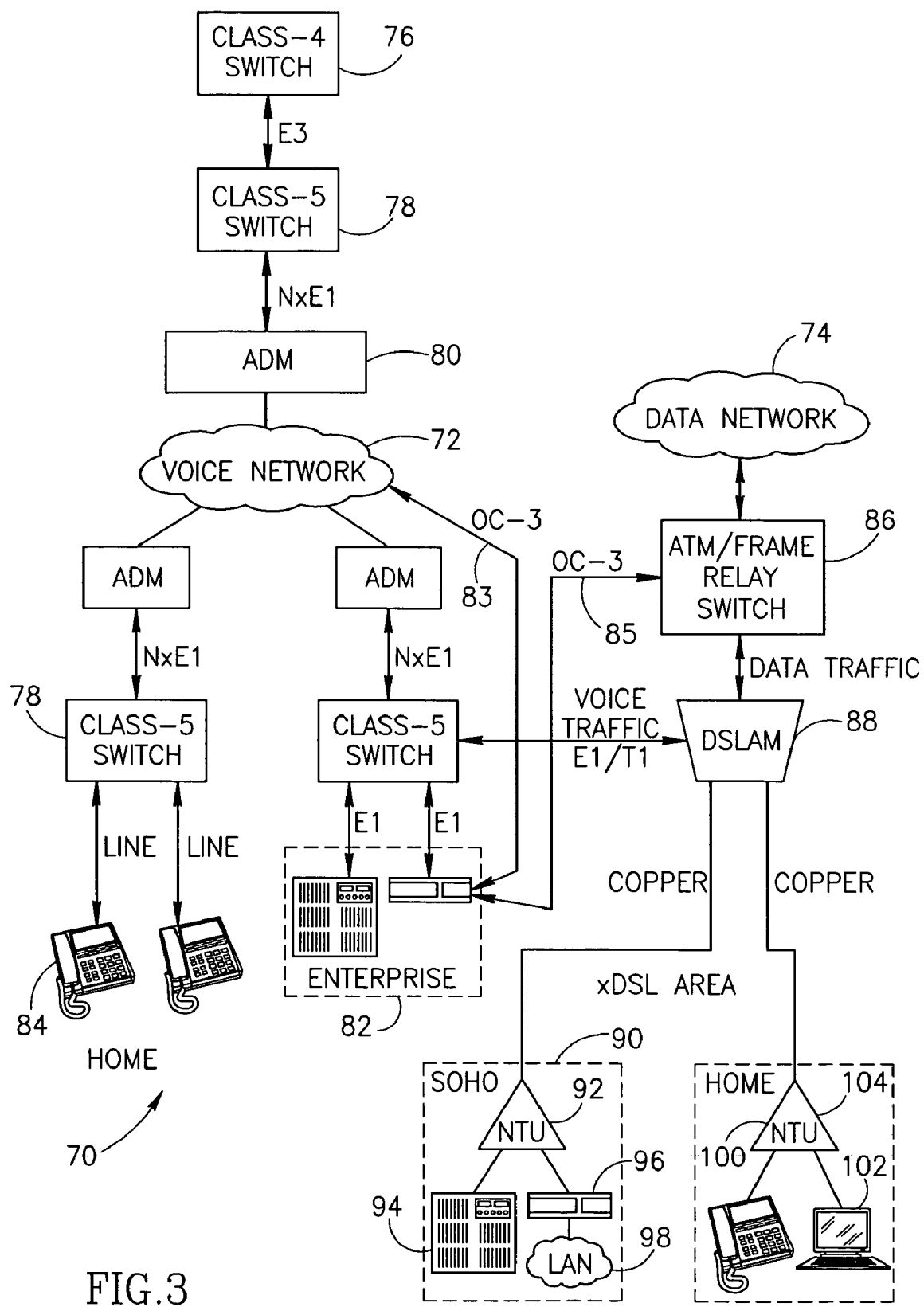
FIG. 3 is a block diagram illustrating a prior art telco network comprising separate voice and data networks.

The following notation is used throughout this document.

| Term | Definition |
| --- | --- |
| ADM | Add Drop Multiplexer |
| ATM | Asynchronous Transfer Mode |
| CBR | Constant Bit Rate |
| CED | Circuit Emulation Device |
| CO | Central Office |
| CPU | Central Processing Unit |
| CRC | Cyclic Redundancy Check |
| CSU | Channel Service Unit |
| DA | Destination Address |
| DCS | Digital Cross Connect |
| DSL | Digital Subscriber Line |
| DSLAM | Digital Subscriber Line Access Multiplexer |
| DSU | Data Service Unit |
| EEPROM | Electrically Erasable Programmable Read Only Memory |
| ESF | Extended Superframe Format |
| ESS | Electronic Switching System |
| FE | Fast Ethernet |
| FR | Frame Relay |
| GE | Gigabit Ethernet |
| IOF | Inter-Office Fiber |
| IP | Internet Protocol |
| ISDN | Integrated Services Digital Network |
| ISP | Internet Service Provider |
| IXC | Inter eXchange Carrier |
| LAN | Local Area Network |
| LEC | Local Exchange Carrier |
| LIU | Line Interface Unit |

-continued

| Term | Definition |
| --- | --- |
| MAC | Media Access Control |
| MAN | Metropolitan Area Network |
| NMS | Network Management System |
| NSP | Network Service Provider |
| NTU | Network Termination Unit |
| OC | Optical Carrier |
| PBX | Private Branch Exchange |
| PCI | Peripheral Component Interconnect |
| PCM | Pulse Code Modulation |
| PDH | Plesiochronous Digital Hierarchy |
| PDU | Protocol Data Unit |
| PRA | Primary Rate Access |
| PRI | Primary Rate Interface |
| PSTN | Public Switched Telephone Network |
| PTT | Post Telephone and Telegraph |
| QoS | Quality of Service |
| RAM | Random Access Memory |
| RTCP | Real Time Transport Control Protocol |
| RTP | Real Time Protocol |
| SA | Source Address |
| SDH | Synchronous Digital Hierarchy |
| SOHO | Small Office Home Office |
| SONET | Synchronous Optical Network |
| TDM | Time Division Multiplexing |
| TLS | Transparent LAN Service |
| TMN | Telecommunication Management Network |
| TTL | Time To Live |
| UDP | User Datagram Protocol |
| VLAN | Virtual Local Area Network |
| VoIP | Voice over Internet Protocol |
| VPN | Virtual Private Network |
| WAN | Wide Area Network |
| 10GE | 10 Gigabit Ethernet |

Definitions Used Throughout

The following definitions are used throughout this document.

| Term | Definition |
| --- | --- |
| ADM | Add Drop Multiplexer - transmission equipment which adds and drop information from an optical ring to/from switching elements. |
| CBR | Constant Bit Rate - usually used in connection with voice information. |
| CED | The encapsulation and segmentation machine that performs E1/T1/E3/T3/OC-3/OC-12 data packaging and towards the IP network, and segmentation on the reverse path |
| Central Office | A central office or CO is an office in a locality to which subscriber home and business lines are connected via what is commonly called the local loop. The central office contains switching equipment that can switch calls locally or to long-distance carrier networks. |
| Class-4 Switch | The telephone switch at a level second lowest in the telephony hierarchy. It is connected on one side to a class-5 switch. |
| Class-5 Switch | The telephone switch at the lowest level in the telephony hierarchy. It is connected on the user side to telephones in the home and PBX equipment in enterprises, and on the network side to class-4 switches through facility transmission equipment. |
| Digital-X | A term used for the series of standard digital transmission rates (i.e. levels) based on DS0 which has a transmission rate of 64 Kbps. Both the North American T-carrier system and the European E-carrier system of transmission operate using the DS series as a base multiple. The main transmission rates include DS0, DS1, T1, E1, DS3, T3 and E3. |

-continued

| Term | Definition |
| --- | --- |
| E_frame | An Ethernet frame comprising an encapsulated frame that includes single or multiple P frames. |
| Egress Path | The path from the Ethernet MAC and PHY towards the Digital-X PHY; Ethernet to Digital-X segmentation is performed in this path. |
| Ingress Path | The path from the Digital-X PHY towards the Ethernet MAC and PHY; Digital-X to Ethernet encapsulation is performed in this path. |
| P_frame | A PCM frame comprising PCM data (32 bytes for an E1 line or 24 bytes for T1 line) |
| Port | A physical TDM port. |
| PRI | A 2 Mbps ISDN connection over E1 or a 1.5 M ISDN connection over T1. |
| RTP Packet | A data packet consisting of the fixed RTP header, a possibly empty list of contributing sources and the payload data. |
| RTP Payload | The data transported by RTP in a packet, for example audio samples or compressed video data. |
| RTP Session | For each participant, the session is defined by a pair of destination Transport Addresses (one Network Address plus a TSAP identifier pair for RTP and RTCP). The destination Transport Address may be common for all participants or may be different for each. In a multimedia session, the media audio and video are carried in separate RTP sessions with their own RTCP packets. The multiple RTP sessions are distinguished by different Transport Addresses. |
| SDH | A standard technology for synchronous data transmission over optical media. SDH is the international equivalent of SONET. Both technologies provide faster and less expensive network interconnection than traditional PDH equipment |
| SONET | The American equivalent for SDH. The performance is nearly the same with small differences in the header data. |

DETAILED DESCRIPTION OF THE INVENTION

The present invention provides a transport facility adapted to transport TDM streams using IP packets. The TDM bit streams are received, buffered and encapsulated into Ethernet frames using the method of the present invention. Using the present invention, TDM streams such as E1, T1, etc. can be transported via Ethernet frames. The resulting Ethernet frames can then be transported over existing transport facilities such as optical fiber, etc. thus enabling Network Service Providers (NSPs) to offer more services for reduced cost. At the destination, the Ethernet frames are segmented and TDM bit streams are regenerated.

For illustration purposes, the principles of the present invention are described in the context of a Circuit Emulation Device (CED) which functions to implement the apparatus and method of the present invention. Example networks are presented wherein the CED is connected in one or more configurations to various networks and network devices. Note, however, it is not intended that the invention be limited to the configurations and embodiments described herein. It is appreciated that one skilled in the electrical and/or networking arts may apply the principles of the present invention to numerous other types of networking devices and network configurations as well without departing from the spirit and scope of the invention. Note that throughout this document, references are made to Ethernet frames, IP packets, RTP packets and UDP packets which are example protocol data units (PDUs) associated with various networks such as Ethernet, H.323, ISO OSI TCP/IP protocol stack. It is appreciated, however, that the invention may be adapted for use in other types of networks that transmit other types of PDUs as well.

Figure 4:
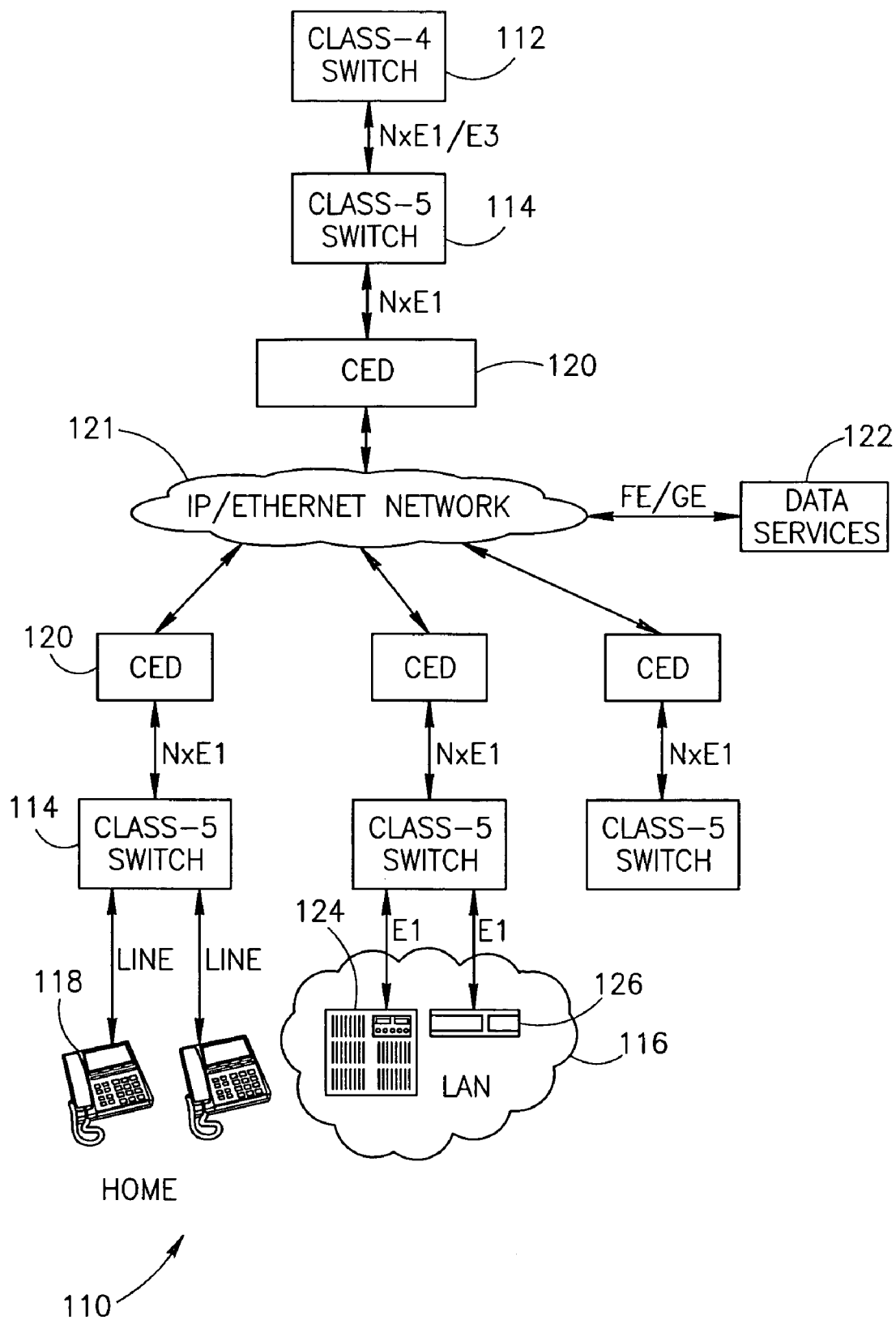
FIG. 4 is a block diagram illustrating an example network incorporating a plurality of circuit emulation devices constructed in accordance with the present invention.

A block diagram illustrating an example network incorporating a plurality of circuit emulation devices constructed in accordance with the present invention is shown in FIG. 4. The example network, generally referenced 110, comprises a plurality of Class-5 switches 114 connected on the user side to both home and enterprise environments. Telephones 118 are connected via copper local loop lines to the user side of a Class-5 switch. A PBX 124 and router 126 in an enterprise LAN 116 are also connected to the user side of a Class-5 switch via TDM lines, e.g., E1, T1, etc.

The Class-5 switches are connected via one or more TDM facilities (e.g., N×E1) to a CED 120. The CED performs encapsulation of the TDM bit stream into IP packets subsequently transported over Ethernet in one direction and segmentation of the IP over Ethernet packets into a TDM bit stream in the other direction. The CEDs are connected to an IP over Ethernet network 121 via Ethernet connections which may include 10Base-T, Fast Ethernet (FE) 100Base-T, Gigabit Ethernet (GE) 1000Base-T or 10 Gigabit Ethernet (10GE) for example.

Connection to higher levels of the hierarchy is through a Class-4 switch 112 connected to one end of a Class-5 switch via high rate TDM facilities (e.g., E3, T3, etc.). The Class-5 switch is connected to a CED via one or more TDM facilities such as N×E1 lines. The CED, in turn, is attached to the IP/Ethernet network 121 via an Ethernet connection having a sufficient data rate.

Thus, the CED of the present invention permits the replacement of legacy transmission equipment in current use today with IP/Ethernet equipment that provides the same functionality but at far less cost. The CED thus emulates traditional circuit based TDM transmission equipment, hence the term 'Circuit Emulation Device.' The CED thus enables the transmission of any type of data since the contents of the TDM bit stream are encapsulated and subsequently segmented without regard to their content. As a result, the use of the CED causes separate data, voice, video, etc. networks to converge into a single network thus realizing the benefits of building, operating and maintaining a single network.

Further, use of the CED enables NSPs to add data services 122 as well. The various data services can be provided by NSPs or third party platforms connected to the IP/Ethernet network 121 via Ethernet connections (e.g., Fast or Gigabit Ethernet).

A key feature of the CED of the present invention is that networks constructed using the CED do not require any changes in the attached telephony switching equipment. Solutions incorporating the CED can re-use the existing fiber infrastructure that a telecommunications carrier already owns and has already been deployed. Using the CED, TDM facilities like E1, T1, etc. can run over IP/Ethernet frames and subsequently over existing optical fiber. This is contrast to the prior art practice of running TDM facilities such as E1, T1, etc. over SONET or SDH networks and then over optical fiber.

The CED based network topology illustrates the result of a transition from a SONET/SDH based transmission network to an Ethernet based transmission network. The implementation of an Ethernet based transmission network may, depending on the application, be based on a gradual replacement of existing TDM facilities (i.e. E1/T1 lines, etc.) from a SONET or SDH network to an Ethernet based network.

Note also that in an alternative embodiment, the CED can be combined with other networking functionality such as routing, IP switching, NMS functions, etc. without departing from the scope of the present invention.

The CED is operative to provide (1) TDM trunk (e.g., E1, T1, E3, T3, etc.) encapsulation over IP/Ethernet; (2) bandwidth flexibility of exiting TDM lines through the IP network using variable encapsulation methods described in more detail hereinbelow; (3) digital multiplexing system functionality such as trunk switching including M13 functions (i.e. multiple E1/T1 into E3/T3 trunks, multiple E3/T3 into OC-3 and OC-12); and (4) network topology flexibility by dynamic assignment of voice trunks between source LECs and destination LECs.

Migration Procedure

Figure 5:
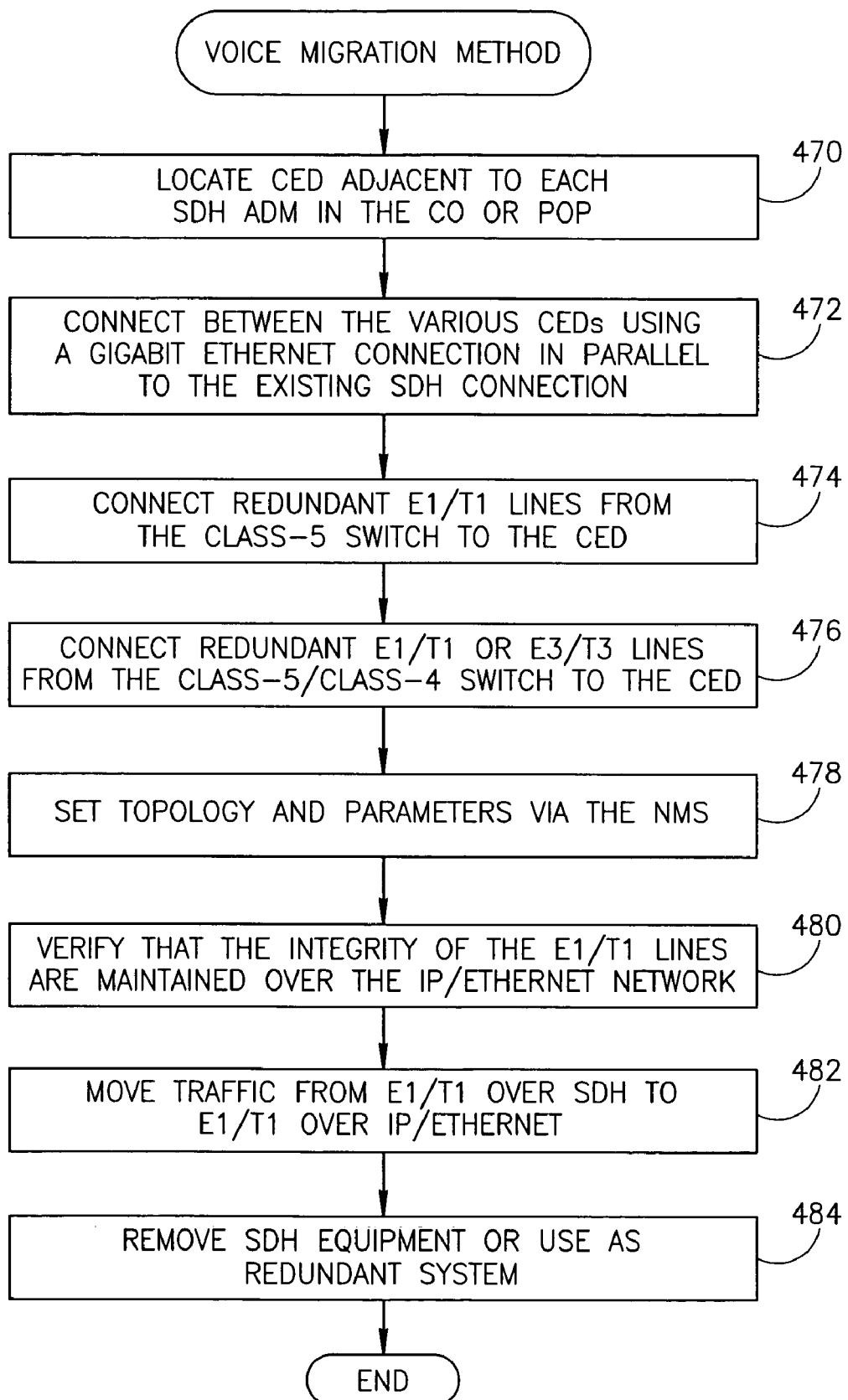
FIG. 5 is a flow diagram illustrating the voice migration procedure for the CED transmission facility of the present invention.

A flow diagram illustrating the voice transmission equipment migration procedure for the CED transmission facility of the present invention is shown in FIG. 5. This is typical for a segment in a Local Exchange Carrier (LEC) where several Class-5 switches are connected in an inter-office fiber (IOF) that is connected to a single Class-4 switch using a SDH ring, star or chain topology.

First, a CED is installed adjacent to each SDH ADM in the CO/POP (step 470). It is preferable that each CED have IP switching capabilities as well. An Ethernet fabric is established by connecting the CEDs to each other using Gigabit Ethernet connections between the CEDs (step 472). The connections are made using an additional fiber in parallel to the existing SDH connection or additional wavelength on the same fiber. Note that the connections can be made either between CEDs or between $3^{rd}$ party routers in the local IP cloud.

Next, redundant E1/T1 lines from the Class-5 switch are connected to the CED (step 474). Redundant E1/T1 or E3/T3 lines from the Class-5 switch, Class-4 switch or Digital Cross Connect (DCS) are connected to the CED (step 476). The topology and parameters of E1/T1 and/or E3/T3 lines are set through the NMS (step 478).

The integrity of the E1/T1 lines over the Ethernet network are then verified (step 480). Traffic is then moved from E1/T1 over SDH to E1/T1 over Ethernet network (step 482), The SDH equipment that is no longer in use is either removed or utilized as a redundant system (step 484).

Note that the procedure described above pertains to the migration of voice networks. In the case where additional data services are provided on the same IP/Ethernet network, the following is noted: (1) all equipment in the network preferably is able to receive QoS enforcement commands and to change prioritization of packets in light of Network Management System (NMS) policies; (2) security is preferably maintained throughout the network using Virtual Private Networks (VPNs) in the network and firewalls at the customer premise; and (3) provision for billing, accounting and provisioning of data services.

Example Network Incorporated Circuit Emulation Device (CED)

Figure 6:
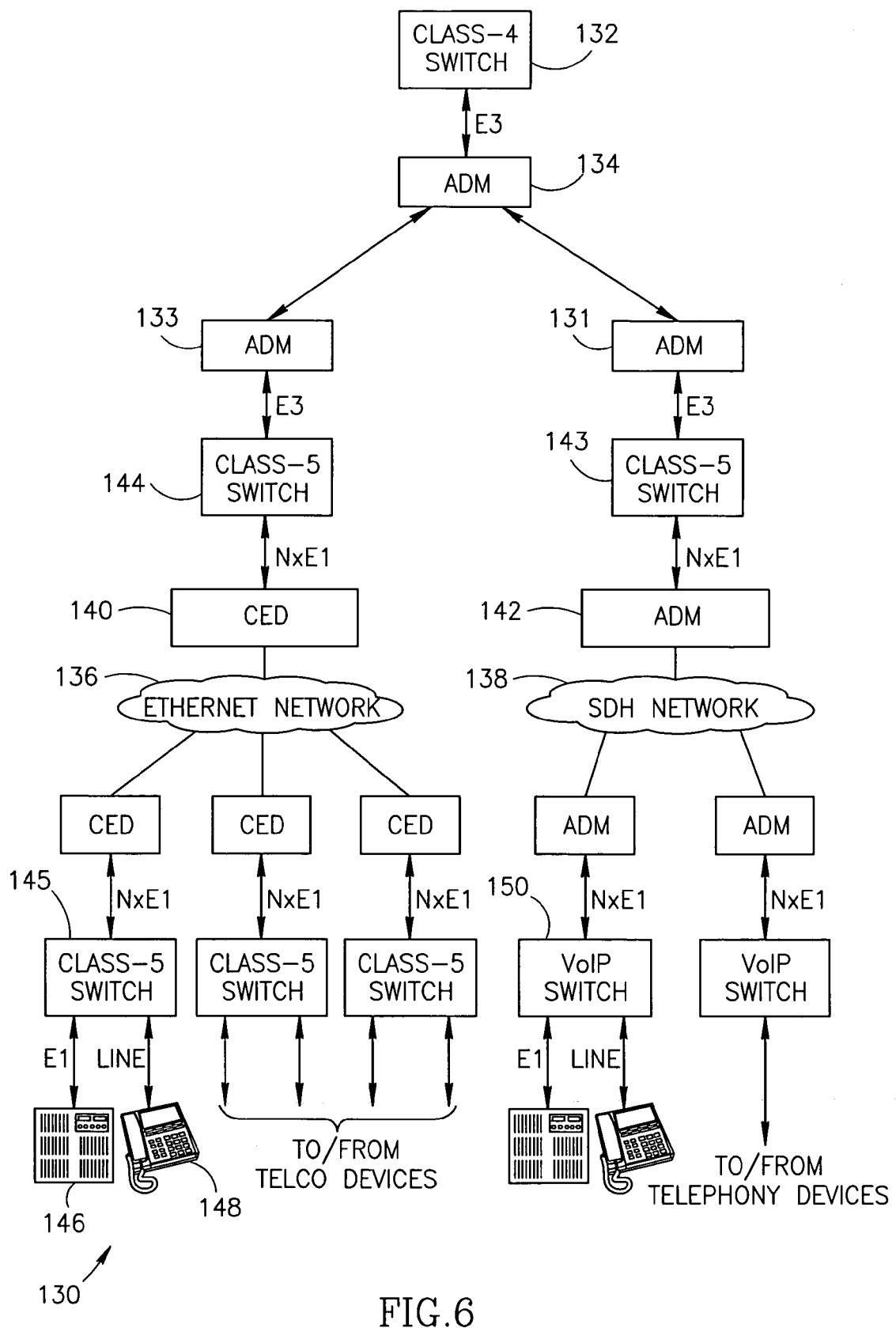
FIG. 6 is a block diagram illustrating an example network incorporating a plurality of circuit emulation devices constructed in accordance with the present invention coexisting with existing VoIP networks.

A block diagram illustrating an example network incorporating a plurality of circuit emulation devices constructed in accordance with the present invention coexisting with existing voice over IP (VoIP) networks is shown in FIG. 6. In an example application, the CED of the present invention coexists with VoIP networks. A key feature of the invention is that the Ethernet network 121 (FIG. 4) is intended to be used as the transmission layer. VoIP networks, however, are intended to replace currently installed switches in the Public Switched Telephone Network (PSTN) network with an IP based switch. The VoIP network is therefore complementary to the CED/Ethernet network of the present invention.

FIG. 6 illustrates two 'islands' of the network, i.e. Ethernet and SDH, built using different technologies while being connected at higher levels in the hierarchy. The left side depicts a CED based LEC solution adapted to connect several Class-5 switches through an Ethernet network. The right side depicts traditional Class-5 connectivity through ADMs and a SDH network. These two LEC islands are connected through a standard Class-4 switch 132 and its appropriate ADMs 131, 133, 134.

In particular, the network, generally referenced 130, comprises an Ethernet network 136 and a SDH network 138. On the Ethernet network side, a plurality of Class-5 switches 145 are connected on the user side to both home and enterprise environments. Telephones 148 are connected via copper local loop lines to the user side of a Class-5 switch. An enterprise PBX 146 is shown connected to the user side of a Class-5 switch 145 via TDM lines, e.g., E1, T1, etc.

The Class-5 switches 145 are connected via one or more TDM facilities (e.g., N×E1) to a CED 140. The CED performs encapsulation of the TDM bit stream into IP packets subsequently transported over Ethernet in one direction and segmentation of the IP over Ethernet packets into a TDM bit stream in the other direction. The CEDs are connected to an IP over Ethernet network 136 via Ethernet connections which may include 10Base-T, Fast Ethernet (FE) 100Base-T, Gigabit Ethernet (GE) 1000Base-T or 10 Gigabit Ethernet (10GE), for example.

On the SDH network side, a plurality of VoIP switched 150 are connected on the user side to a plurality of IP telephones via local loop lines and to enterprise equipment such as PBXs via TDM lines (e.g., E1, T1, etc.) or VoIP PBXs using Ethernet. On the network side, the VoIP switches 150 are connected to ADMs 142 via one or more TDM lines (i.e. N×E1 lines). The ADMs 142 are connected to form the SDH network 138. A gateway Class-5 switch 143 is connected to the SDH network via one or more TDM lines and to an ADM via a high speed TDM line (e.g., E3, T3, etc.).

The gateway Class-5 switch 143 is connected via a high data rate TDM line (e.g., E3, T3, etc.) to ADM 131. On the Ethernet side, Class-5 switch 144 is connected to ADM 133 via E3, T3, etc. TDM lines. Connection to higher levels of the hierarchy is through a Class-4 switch 132 connected to common ADM 134 which is connected to ADMs 133, 131.

Note that the Class-5 VoIP switches 150 support on the end-user side either legacy telephones or IP telephones. On the network side, the VoIP switch is connected as previously to the switches by multiple E1 connections towards the transmission equipment. The VoIP switches are constructed based on the H.323 protocol that supports a full set of features and capabilities similar to those of currently available switches. Class-4 VoIP switches are connected on both sides to TDM ports (e.g., E1, T1, etc.) towards the transmission equipment.

Example Converged Network

Figure 7:
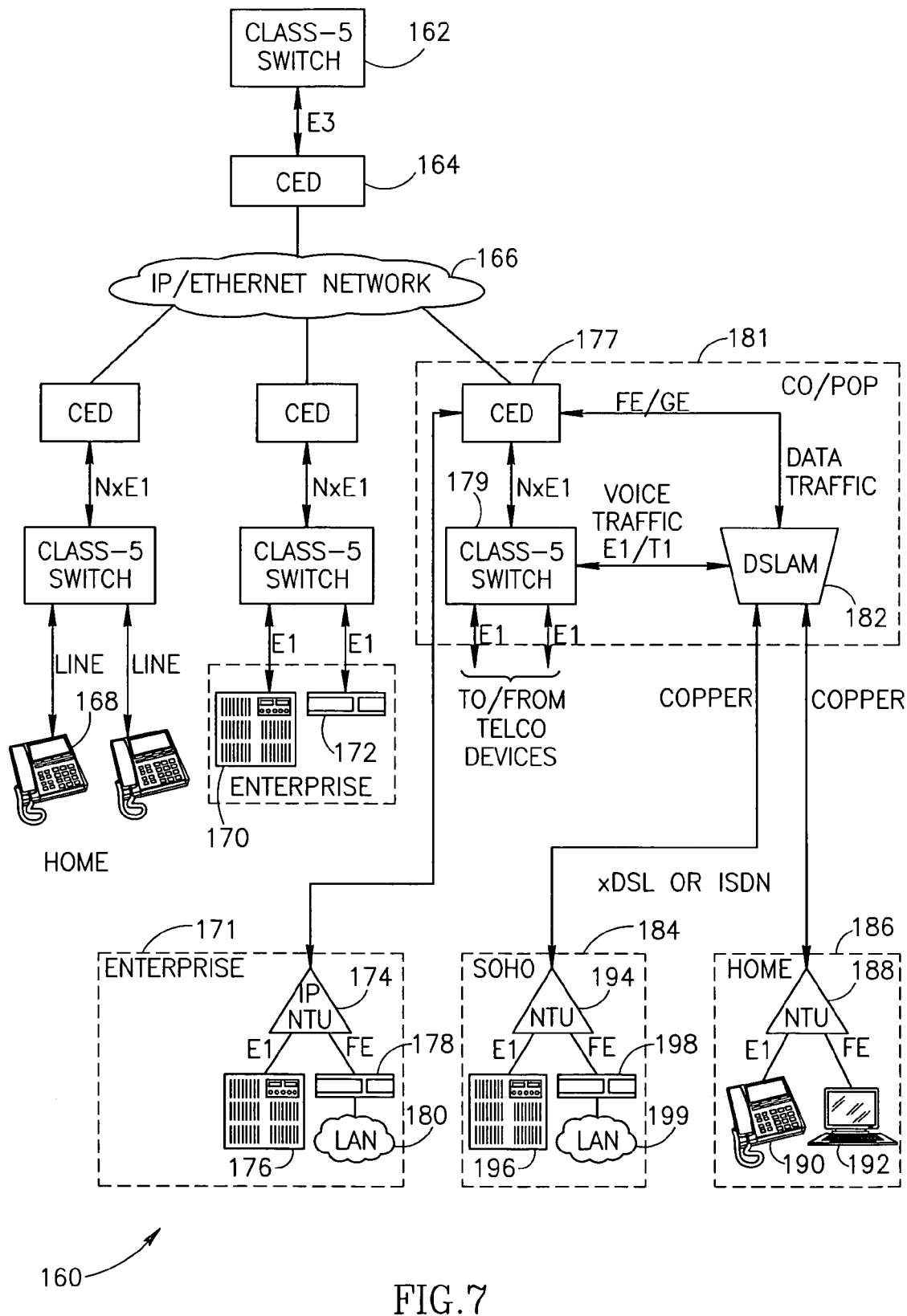
FIG. 7 is a block diagram illustrating an example converged voice and data network incorporating a plurality of circuit emulation devices constructed in accordance with the present invention.

An example of an IP based network merged will now be presented. A block diagram illustrating an example converged voice and data network incorporating a plurality of circuit emulation devices constructed in accordance with the present invention is shown in FIG. 7. FIG. 7 describes an example application of the CED of the present invention wherein a merged IP based network provides both voice and data services using the same infrastructure.

The example network, generally referenced 160, comprises a plurality of Class-5 switches 162 connected on the user side to both home and enterprise environments. Telephones 168 are connected via copper local loop lines to the user side of a Class-5 switch. A PBX 170 and router 172 in an enterprise are also connected to the user side of a Class-5 switch via TDM lines, e.g., E1, T1, etc.

The Class-5 switches are connected via one or more TDM facilities (e.g., N×E1) to a CED 164. The CED is operative to perform encapsulation of the TDM bit stream into IP packets subsequently transported over Ethernet in one direction and segmentation of the IP over Ethernet packets into a TDM bit stream in the other direction. The CEDs are connected to an IP over Ethernet network 166 via Ethernet connections which may include 10Base-T, Fast Ethernet (FE) 100Base-T, Gigabit Ethernet (GE) 1000Base-T or 10 Gigabit Ethernet (10GE), for example.

Connection to higher levels of the hierarchy is through a Class-4 switch (not shown) connected to one end of a Class-5 switch via high rate TDM facilities (e.g., E3, T3, etc.). The Class-5 switch is connected to a CED via one or more TDM facilities such as N×E1 lines. The CED, in turn, is connected to the IP/Ethernet network 166 via an Ethernet connection having a sufficient data rate.

The example network illustrated here also shows the integration of enterprise, SOHO and home generated traffic into the same single IP/Ethernet network via a CED 177 placed in the CO or POP 181. In the enterprise environment 171, a PBX 176 is connected to an IP based NTU 174. A LAN 180 is connected via a router 178 to the NTU through a Fast Ethernet connection. The IP based NTU is connected directly to the CED 177 in the CO/POP 181 via a high speed Ethernet connection such as Gigabit Ethernet.

In the SOHO environment 184, a PBX 196 is connected to an NTU 194. A LAN 199 is connected to a router 198 which in turn is connected to the NTU through a Fast Ethernet connection. The NTU is connected to a DSLAM 182 in the CO via a copper xDSL or Integrated Services Digital Services (ISDN) connection. Splitter means in the DSLAM separates the voice traffic from the data and sends the voice traffic to a Class-5 switch 179 via a TDM connection. The data traffic is routed to the CED 177.

Similarly, the home environment 186 comprises telephones 190 and workstations 192 connected to a NTU 188 via E1 and Fast Ethernet, respectively. The NTU is connected to the DSLAM 182 in the CO/POP via copper xDSL or ISDN connection.

A key feature of such a network 160, is that the telecommunications company needs only to operate a single IP network (i.e. IP/Ethernet network 166). This network is operative to support legacy voice and data services using currently used configurations. In addition, the network enables new methods of connectivity such as direct Ethernet connectivity to business enterprises.

The business enterprise connectivity can be achieved either through direct Ethernet connection for both voice and data services or through the current implementation of TDM (i.e. E1/T1) links. Note that in accordance with the present invention, when Ethernet connectivity is used, the voice traffic is either (1) packetized over IP for legacy PBX equipment or (2) generated using direct IP/Ethernet connectivity in the case of LAN telephony products, e.g., IP telephones, etc.

Emulation/Segmentation Machine

Figure 8:
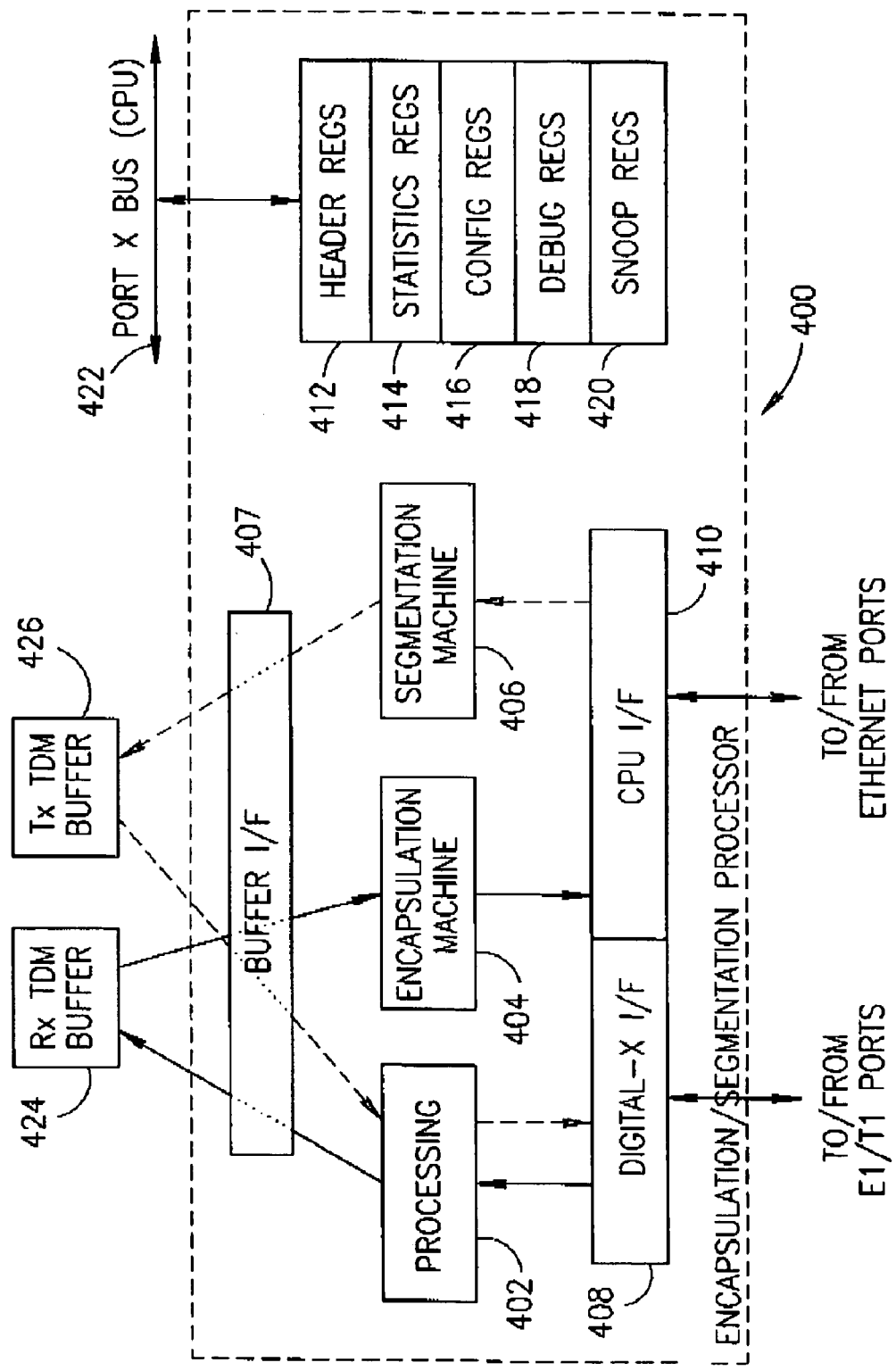
FIG. 8 is a block diagram illustrating the emulation/segmentation machine of the present invention in more detail.

A block diagram illustrating the emulation/segmentation machine of the present invention in more detail is shown in FIG. 8. At the core of the CED is an encapsulation/segmentation processor, generally referenced 400. The processor 400 comprises TDM interface(s) 408, CPU interface 410, processing unit 402, encapsulation machine 404, segmentation machine 406, buffer interface 407, and a plurality of registers including header registers 412, statistics registers 414, configuration registers 416, debug registers 418 and snooping registers 420.

The TDM interface 408 is coupled to a plurality of TDM ports, e.g., E1, T1, etc., and adapted to provide a bi-directional interface to a plurality of constant TDM synchronous serial bit streams. The CPU interface 410 is adapted to provide an interface to one or more Ethernet ports. The various registers are adapted to be read from and written to over a CPU bus 422.

An ingress Rx buffer 424 functions to store TDM stream data before being encapsulated into Ethernet frames. Similarly, egress Tx buffer 426 functions to store TDM stream data after received Ethernet frames are segmented.

Note that the solid arrows indicate the ingress data path from TDM ports to Ethernet network while the dashed arrows indicate the egress data path from Ethernet network to TDM ports.

In operation, real-time ingress data from the TDM ports is received by the processor 402 over multiple constant serial bit streams. The processor 402 is operative to store the received TDM data in a queue within the Rx TDM memory buffer 424 wherein the data is grouped according to output Ethernet frames, i.e. all the TDM data to be assembled into a single Ethernet frame is stored together. The TDM data is stored in the ingress TDM buffer in accordance with the configuration scheme set by the host.

The manner of storing the TDM data can be either (1) according to the particular TDM port number or (2) according to time duration. In the former case, data from a plurality of TDM ports is packaged into a single Ethernet frame. In the latter case, a plurality of TDM frames from a single port are packaged into a single Ethernet frame. In addition, a combination of (1) and (2) above can be implemented, i.e. several ports with several durations.

Note that the sorting of the TDM data into Ethernet frames can be performed upon writing the data into the Tx TDM buffer or by the encapsulation machine 404 upon reading the data. The encapsulation machine 404 reads the data from the Tx TDM buffer 424 and optionally performs encryption and/or compression on the data. The encapsulation machine 404 then calculates the CRC checksum for use in generating the UDP packet contents. In accordance with the invention, the TDM data is packaged into RTP packets, then UDP packets, then IP packets and finally Ethernet frames. The encapsulation machine then generates the appropriate header information for the RTP, UDP, IP and Ethernet packets. The TDM data along with the header information is used to generate the complete RTP, UDP, IP and Ethernet packets. Once the Ethernet frame is constructed, it is transmitted towards the MAC device.

In the egress direction, Ethernet frames enter the encapsulation/segmentation processor 400 from the Ethernet port. Preferably, the frame is pipelined in the segmentation machine 406 to facilitate header processing. The segmentation machine 406 is operative to extract the IP, UDP and RTP packets from the frame and use the RTP header information to select the appropriate queue in the Tx TDM buffer 426.

Note that additional buffering may be necessary for performing rate adaptation towards the Tx TDM buffer. The extracted TDM data is stored in Tx TDM buffer memory 426. The processor 402 then reads the TDM data from the buffer 426 and re-generates TDM data streams. The regenerated streams are forwarded to the PHY interfaces (i.e. E1, T1, etc.) for transmission as a plurality of constant synchronous TDM bit streams.

Note that the TDM data is extracted from the Ethernet frames in accordance with the configuration parameters set in the ingress direction, i.e., either multiple TDM frames from different ports or multiple TDM frames from a single port per Ethernet frame.

In one embodiment, the segmentation machine is operative to write the extracted TDM data according to TDM ports in the Tx TDM buffer 426. Alternatively, the TDM data can be written according to received Ethernet frames and sorted by TDM port upon the processor 402 reading from the buffer 426. Both schemes, however, achieve the same results.

Circuit Emulation Device (CED)

Figure 9:
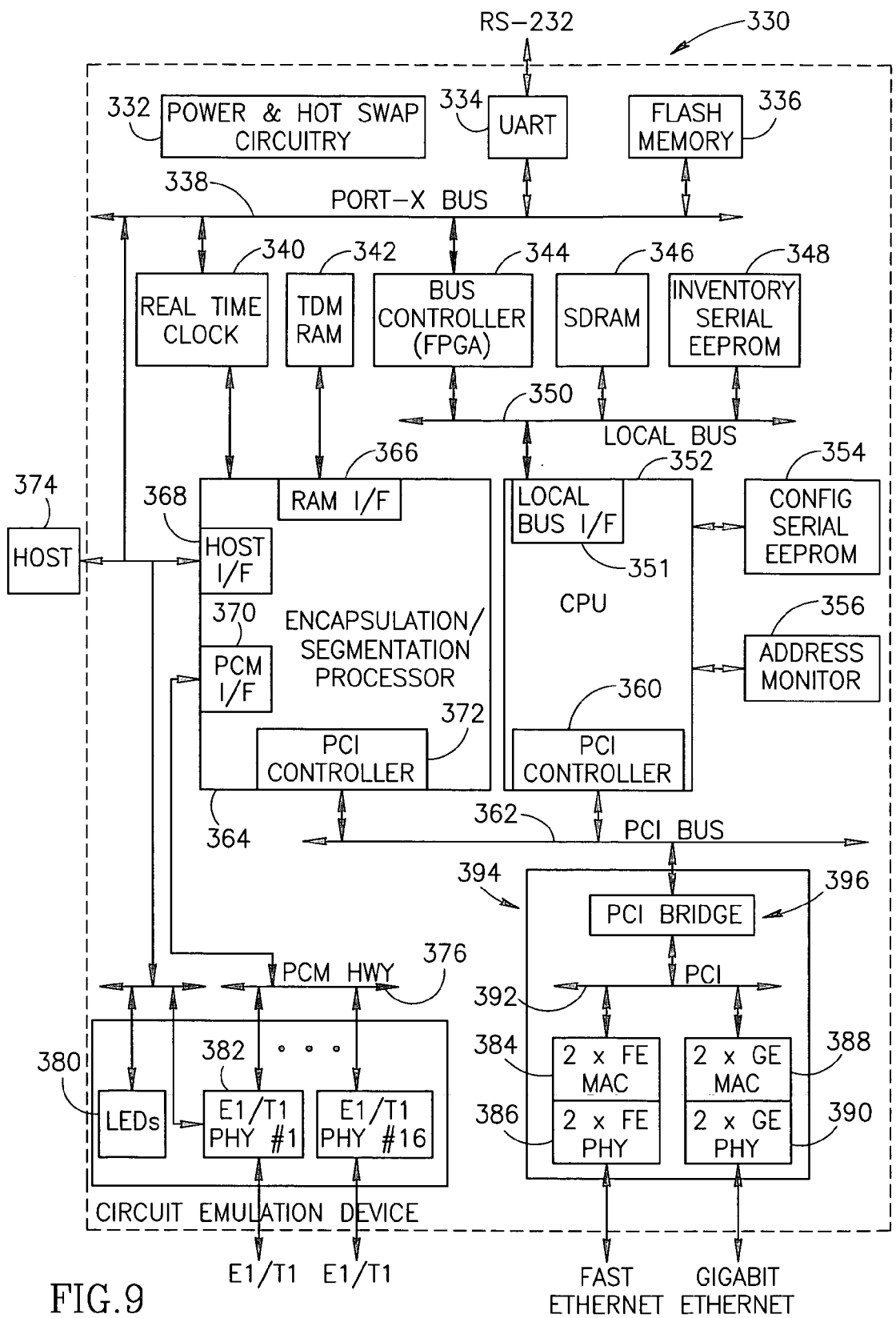
FIG. 9 is a block diagram illustrating the hardware architecture of the hardware circuit emulation device of the present invention.

A block diagram illustrating the hardware architecture of the hardware circuit emulation device of the present invention is shown in FIG. 9. The Circuit Emulation Device, generally referenced 330, is adapted to provide a bi-directional data path between a plurality of TDM bit streams and at least one Ethernet interface connected to an Ethernet network. At the core of the CED is a encapsulation/segmentation processor 364 and a CPU 352. The processor 364 comprises a PCM/TDM interface 370, host interlace 368, memory interface 366 and a PCI controller 372 to a PCI bus 362. The CPU 352 comprises a PCI controller 360 to a PCI bus 362 and interfaces to a configuration serial EEPROM 354, address monitor 356 and a local bus 350.

Attached to the port bus 338 are a real time clock 340, bus controller 344, UART 334 for providing a RS-232 control port to the CPU, Flash memory 336 and host 374. Power and hot swap circuitry 332 is also provided. The CPU communications with the local bus 350 via a local bus interface 351. CPU RAM memory 346 and inventory serial EEPROM 348 are connected to the CPU via the local bus 350.

On the TDM line side, the CED comprises a plurality of TDM PHY interface circuits 382. In the example presented herein, 16 E1/T1 PHY interface circuits are provided. Each functions to interface either an E1 or T1 line to a PCM highway bus 376 which is connected to the encapsulation/segmentation processor via PCM interface 370. The CED is adapted to receive and transmit CBR data to and from the 16 ports of E1/T1. Each port comprises a bidirectional serial port that is connected to the PHY block 382. Note that any number of PHY blocks may be provided and that PHY blocks may be provided that are adapted to interface to other types of standard or non-standard TDM signals as well, such as E3, T3, OC-3 or OC-12 lines. Front panel LEDs 380, connected to the port bus, are also provided for indicating line status, activity, etc.

The digital-X ports 382 can be adapted to be configurable as either E1, T1, E3, T3, OC-3 or OC-12 ports. Each PHY block constituting a port comprises a framer (e.g., D4, ESF), line interface unit (LIU) and magnetic components (not shown). The PHY also performs the required signaling functions robbed bit, Clear Channel Support (CCS) or transparent. In addition, the PHY circuitry comprises a protection component such as a CSU/DSU which is needed when the line is may be exposed to lightning. Note that this is usually the case when the switching product is not co-located with the CED in the same building. Note also that the PHY circuit may be adapted to interface to other types of lines as well such as unbalanced E1 lines, ISDN BRI or PRI, etc.

Note that the CED preferably is constructed to support TDM Streams that typically comprise carrier voice channels. In this case, the CED is adapted to support low delay requirements of voice while supporting unreliable transport of the data. Since most Carriers also support video and data, however, a management task in the CED is adapted to configure the system for different category requirements.

The CPU is operative to configure the framer and the LIU in each PHY circuit to the correct mode of operation. In addition, the CPU monitors both the framer and LIU for various alarms and statistical information. In an alternative embodiment, the CPU 352 is adapted to communicate with the telecommunications signaling layer by extracting signaling information directly from the framer through a dedicated interface.

On the Ethernet side, one or more Ethernet interfaces are provided for linking the CED to 10Base-T, 100Base-T Fast Ethernet or 1000Base-T Gigabit Ethernet connections. In the example presented herein, two Fast Ethernet and two Gigabit Ethernet interfaces are provided. The interface comprises two FE PHY interface circuits 386, two FE Layer 2 MAC circuits 384, two GE PHY interface circuits 390 and two GE Layer 2 MAC circuits 388. The Ethernet interface circuits are connected to a secondary PCI bus 392 over which data is transmitted to and received from the processor 364 via the PCI bridge 396.

The FE and/or the GE ports are normally connected to an external Ethernet switch or router towards the IP/Ethernet cloud. When faster connectivity is needed, the GE ports can be used. Note that the CPU 352 is operative to control both the FE and GE MAC devices 384, 388, respectively, directly and through the processor 364. Control functions include configuration, monitoring and exception handling.

The encapsulation/segmentation processor 364 comprises a fast memory interface (e.g., RAM, SDRAM, etc.) for buffering ingress and egress data. The TDM RAM is divided into Rx ingress and Tx egress buffers. The memory size must be sufficient to store the required amount of TDM data to achieve the latency and delay requirements of the particular application. TDM data is stored before it is encapsulated into Ethernet frames in the ingress direction and is stored either before or after segmentation into TDM streams (e.g., E1/T1 streams) in the egress direction.

The operating parameters for the encapsulation/segmentation processor 364 are set by the CPU 352. The basic encapsulation block is a full TDM frame, e.g., E1/T1 frame. This block can be encapsulated, however, in either of two dimensions: by ports or by time. On the port axis the encapsulation processor 364 is operative to encapsulate a plurality of ports in the same Ethernet frame (up to 16 in this example). On the time axis, the encapsulation processor 364 is operative to encapsulate a plurality of TDM frames from the same port (up to 8 frames in this example). The ability to configure the CED provides scalability and network dependant performance in terms of delay and priority.

The segmentation processor 364 machine is operative to partition the Ethernet frame into separate TDM streams. Note that the segmentation process is performed in accordance with the previously configured encapsulation parameters.

The encapsulation/segmentation processor 364 is adapted to receive commands from the CPU via the PCI interface or from the host 374 via the host interface 368. In addition, the CPU can read various status information generated by the processor. The parameters include:

1. Configuration parameters: port type (E1/T1, E3/T3, etc.), port number; encapsulation scheme: port and time duration variables; data type per channel/port and grouping (if applicable): voice, data, and video, PCI target destination.
2. Statistics registers count encapsulation and segmentation operations. For example, the created Ethernet frames that were sent towards the MAC layer, the number of Ethernet frames received from the MAC layer and the number of Ethernet frames received from the MAC layer which did not arrive in the correct order. This information is checked using the Time Stamp and/or stream number field in the RTP packet header.
3. Header registers hold the application, UDP, IP and Ethernet header information per encapsulation process.
4. Debug registers enable CPU access to the TDM RAM for debugging.
5. Snooping registers enable collection of TDM or Ethernet data towards the CPU for monitoring or signaling processing.

In addition, the CPU has access to the status registers in the CED that provide information on the operation of the CED. Debug access to the TDM RAM by the CPU is also provided using debug registers.

Note that the PCI interface in the CED is configured as target and master. The processor 364 communicates with the FE and GE Ethernet ports via the PCI interface 372 over the PCI bus 362. The PCI bus is 32 bits wide at 66 MHz thus providing 1 Gbps bidirectional throughput. The connectivity to the GE MACs 388 is directly over the primary PCI bus 362 while connectivity to the FE MACs 384 is through the PCI bridge 396.

As described previously, in this example, the PHY blocks comprise 16 ports of E1/T1 interfaces. In the ingress direction, the framer in each PHY block is operative to receive PCM data and forward this data towards the encapsulation processor 364 in PCM frame format called P_frame format. The encapsulation processor 364 then performs data processing based on the static configuration defining the ports to be encapsulated together and the encapsulation period.

The encapsulation processor utilizes uses these parameters to pack together the relevant P_frames and encapsulate them with the appropriate headers. The encapsulated Frame is forwarded to the Ethernet MAC for FCS calculation and PCS functions, and subsequently forwarded to the IP/Ethernet network.

In the egress direction, Ethernet frames are received by a MAC device, and after an integrity check, are forward through the CPU to the segmentation processor 364. The segmentation processor analyzes the RTP header and segments the data into P_frames in accordance therewith. Each P_frame is then stored in its associated buffer after the timestamp, delay and dropping rate are analyzed. The data is then forwarded synchronously toward to the framer in the relevant PHY block for transmission.

CED Protocol Stack

Figure 10:
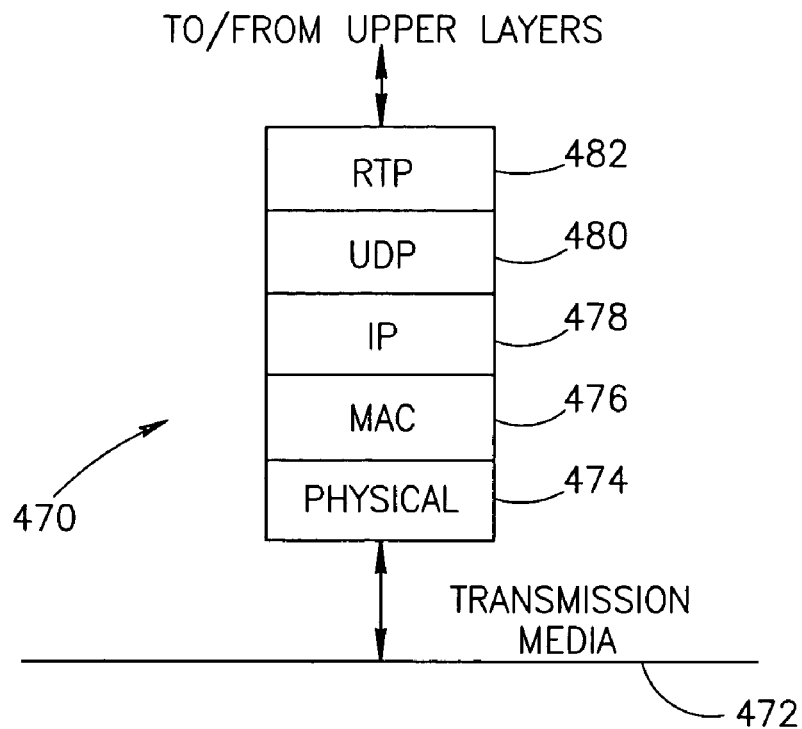
FIG. 10 is a block diagram illustrating the protocol stack implemented in the hardware circuit emulation device of the present invention.

A block diagram illustrating the protocol stack implemented in the hardware circuit emulation device of the present invention is shown in FIG. 10. As described previously, the CED is operative to encapsulate the TDM bit stream into Ethernet frames in the ingress direction and to segment Ethernet frames into TDM streams in the egress direction. Multiple protocol layers are used to transport the data over the Ethernet network. The protocol stack, generally referenced 470, comprises an RTP packet layer 482, UDP packet layer 480, IP packet layer 478, MAC layer 476 and a physical layer 474 which is connected to the transmission medium 472. The encapsulation at each of the protocol layers is described in more detail hereinbelow. For-certain applications a reduced version is also applicable. For example, using only the physical, MAC and IP layers.

E_frames and P_frames

Figure 11:
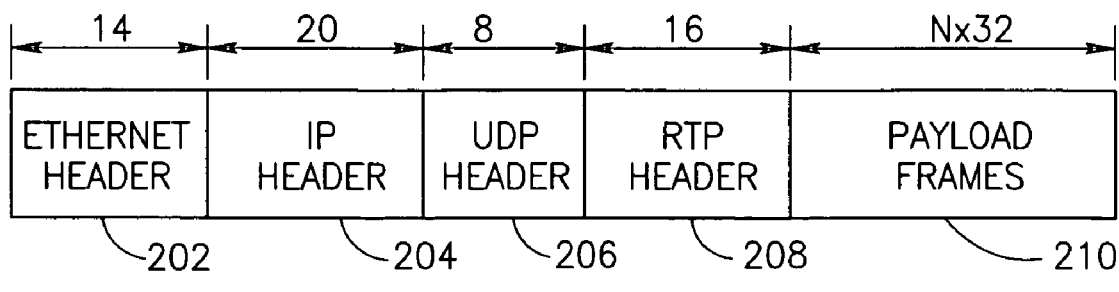
FIG. 11 is a diagram illustrating the encapsulated frame format of the present invention.

A diagram illustrating the encapsulated frame (E-frame) format of the present invention is shown in FIG. 11. The PCM data from the TDM bit stream is represented as P_frames (e.g., 32 bytes for an E1 line and 24 bytes for a T1 line, and higher for additional rates). The E-frame format, generally referenced 200, comprises an Ethernet header 202, IP header 204, UDP header 206, RTP header 208 and a plurality of N payload frames 210. The length of each frame is dependent on the type of TDM line. The CED is adapted to encapsulation multiple data sources into a single IP frame. During the encapsulation process, the RTP, UDP, IP and Ethernet headers are constructed.

P_frames are adapted to include only whole TDM frames. Received TDM frames are not split. Note that the number N of frames packed into each E_frame determines the resulting latency. Additional P_frames results in longer latency times and vice versa. Note that in some applications, the headers can be compressed in order to reduce the overhead. Large long haul communications networks would typically require full headers be transmitted. Shorter headers may be used with smaller private networks depending on the application.

The invention has application with many different types of protocols, including, but not limited to, RTP, UDP, TCP, IP and Ethernet. It is appreciated that other protocols can also be used. Brief descriptions of the header formats for RTP, UDP, TCP, IP and Ethernet are presented hereinbelow. A more detailed description of these well known protocols can be found in their respective standards.

RTP Packet Header

Figure 12:
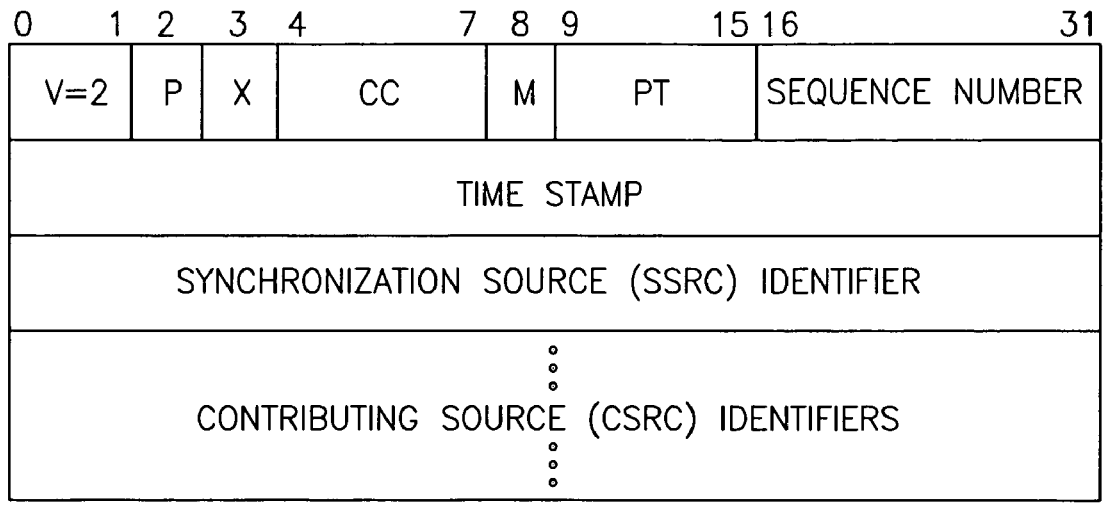
FIG. 12 is a diagram illustrating the RTP header format.

A diagram illustrating the Layer 5 RTP header format is shown in FIG. 12. The RTP header, generally referenced 210, comprises the following fields:

Version (V): 2 Bits

This two bit field identifies the version of the RTP protocol. The version defined by this specification is two (2).

Padding (P): 1 Bit

A one bit field that, if set, indicates that the packet contains one or more additional padding octets at the end which are not part of the payload. The last octet of the padding contains a count of how many padding octets should be ignored. Padding may be needed by some encryption algorithms with fixed block sizes or for carrying several RTP packets in a lower-layer protocol data unit.

Extension (X): 1 Bit

If the extension bit is set, the fixed header is followed by exactly one header extension, with a format defined in RTP standard.

CSRC Count (CC): 4 Bits

The CSRC count contains the number of CSRC identifiers that follow the fixed header.

Marker (M): 1 Bit

The interpretation of the marker is defined by a profile. It is intended to allow significant events such as frame boundaries to be marked in the packet stream. A profile may define additional marker bits or specify that there is no marker bit by changing the number of bits in the payload type field.

Payload type (PT): 7 Bits

This field identifies the format of the RTP payload and determines its interpretation by the application. A profile specifies default static mapping of payload type codes to payload formats. Additional payload type codes may be defined dynamically through non-RTP means. An RTP sender emits a single RTP payload type at any given time.

Sequence Number: 16 Bits

The sequence number increments by one for each RTP data packet sent, and may be used by the receiver to detect packet loss and to restore packet sequence. The initial value of the sequence number is random (unpredictable) to make known-plain text attacks on encryption more difficult, even if the source itself does not encrypt, because the packets may flow through a translator that does.

Timestamp: 32 Bits

The timestamp reflects the sampling instant of the first octet in the RTP data packet and is used for re-ordering purposes. The sampling instant must be derived from a clock that increments monotonically and linearly in time to allow synchronization and jitter calculations. The resolution of the clock must be sufficient for the desired synchronization accuracy and for measuring packet arrival jitter (one tick per video frame is typically not sufficient). The clock frequency is dependent on the format of data carried as payload and is specified statically in the profile or payload format specification that defines the format, or may be specified dynamically for payload formats defined through non-RTP means. If RTP packets are generated periodically, the nominal sampling instant as determined from the sampling clock is to be used, not a reading of the system clock. As an example, for fixed-rate audio the timestamp clock would likely increment by one for each sampling period. If an audio application reads blocks covering 160 sampling periods from the input device, the timestamp would be increased by 160 for each such block, regardless of whether the block is transmitted in a packet or dropped as silent.

The initial value of the timestamp is random, as for the sequence number. Several consecutive RTP packets may have equal timestamps if they are (logically) generated at once, e.g., belong to the same video frame. Consecutive RTP packets may contain timestamps that are not monotonic if the data is not transmitted in the order it was sampled, as in the case of MPEG interpolated video frames.

SSRC: 32 Bits

The SSRC field identifies the synchronization source. This identifier is chosen randomly, with the intent that no two synchronization sources within the same RTP session will have the same SSRC identifier. If a source changes its source transport address, it must also choose a new SSRC identifier to avoid being interpreted as a looped source.

CSRC List: 0 to 15 Items 32 Bits Each

The CSRC list identifies the contributing sources for the payload contained in this packet. The CC field gives the number of identifiers. If there are more than 15 contributing sources, only 15 may be identified. Mixers, using the SSRC identifiers of contributing sources insert CSRC identifiers. For example, for audio packets the SSRC identifiers of all sources that were mixed together to create a packet are listed, allowing correct talker indication at the receiver.

Further details on the RTP protocol can be found in Annex A of the ITU-T H.225.0 specification, incorporated herein by reference.

UDP Packet Header

Figure 13:
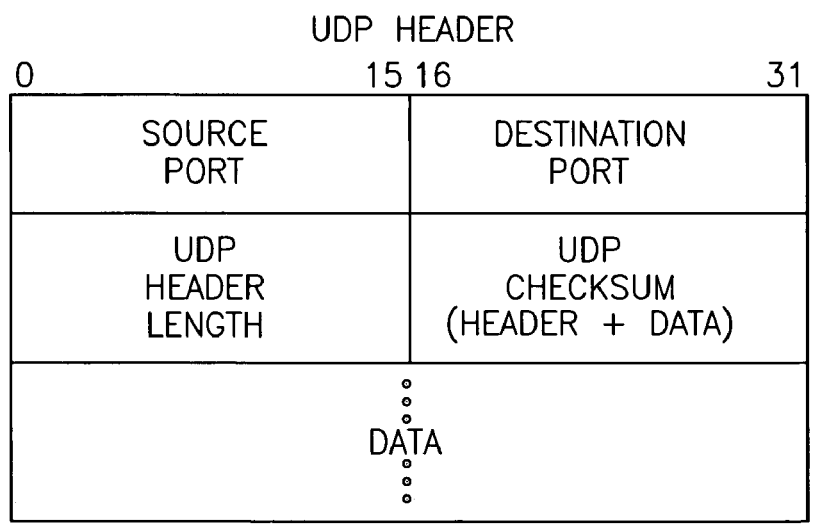
FIG. 13 is a diagram illustrating the UDP frame format.

A diagram illustrating the Layer 4 UDP frame format is shown in FIG. 13. The UDP header, generally referenced 230, comprises source and destination port fields, header length field, checksum field and data field. Note that the CRC checksum in the UDP header is calculated over the combined header and the data. The port numbers identify the sending process and the receiving process. They are used for multiple logical connections between the same physical ports. The length field is the length of the UDP header and the UDP data in bytes. A minimum length value of 8 is used when no data is sent.

TCP Packet Header

Figure 14:
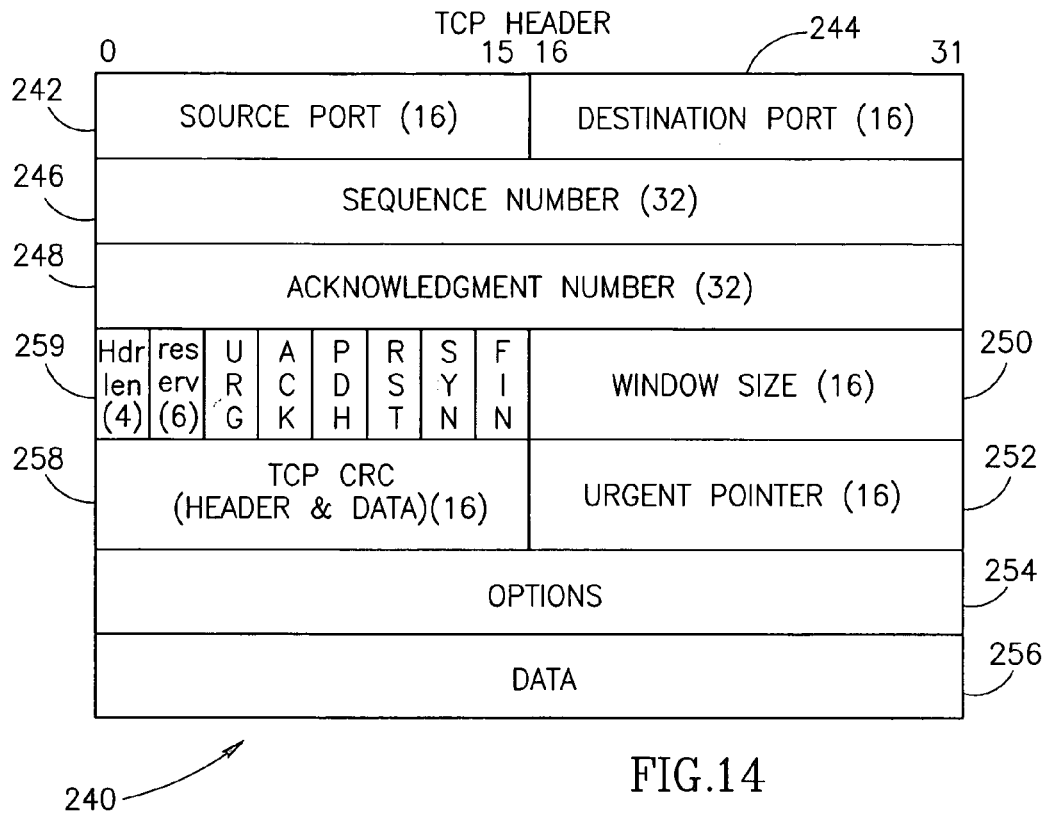
FIG. 14 is a diagram illustrating the TCP frame format.

A diagram illustrating the Layer 4 TCP frame format is shown in FIG. 14. The TDP header, generally referenced 240, comprises a 16 bit source port 242, 16 bit destination port 244, 32 bit sequence number 246, 32 bit acknowledgement number 248 a plurality of fields 259, 16 bit window size 250, 16 bit TCP CRC field 258, 16 bit urgent pointer field 252, 32 bit options field 254 and data field 256.

The port numbers identify the sending application and the receiving application. These ports along with the IP source and destination address uniquely identify each connection. This combination is called socket. The sequence number identifies the byte in the stream of data from the sending TCP to the receiving TCP. It is a 32 bit unsigned number that wraps back around to 0 after reaching $2^{32}-1$. The header length gives the length of the TCP header in 32-bit words. This is required because the option field is variable. The window size is advertised by both ends and represents the number of bytes that each can accept. The TCP CRC checksum is calculated over the combined TCP header and data. The urgent pointer is valid only if the URG flag is set. The remaining fields are defined in accordance with the standard TCP protocol.

IP Packet Header

Figure 15:
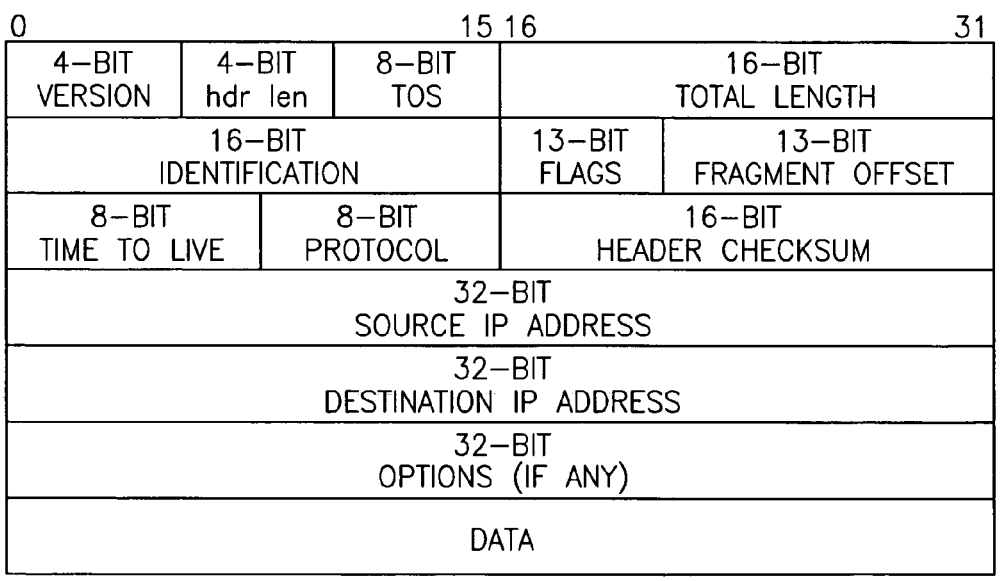
FIG. 15 is a diagram illustrating the IP frame format.

A diagram illustrating the Layer 3 IP frame format is shown in FIG. 15. The IP frame, generally referenced 250, comprises a 4 bit version field, 4 bit header length field, 8 bit TOS field, 16 bit total length field in bytes, 16 identification field, 3 bit flags field, 13 bit fragment offset field, 8 bit time to live field, 8 bit protocol field, 16 bit header checksum field, 32 bit source IP address, 32 bit destination IP address, 32 bit options field and a data field.

The IP version used is IP v4. The header length comprises the length of the header plus options in 32 bit words. The TOS bits are used for prioritization. The identification field comprises a number which is incremented by the host per packet. Usually it is used for fragmentation and reassembly of packets. The time to live (TTL) bits are decremented per hop till they reach the value of zero. When zero is reached, the packet is discarded. The protocol field identifies the protocol in use. The header checksum is calculated over the IP header only. The IP SA and DA addresses identify the source station and the end station, respectively.

Ethernet Frame Format

Figure 16:
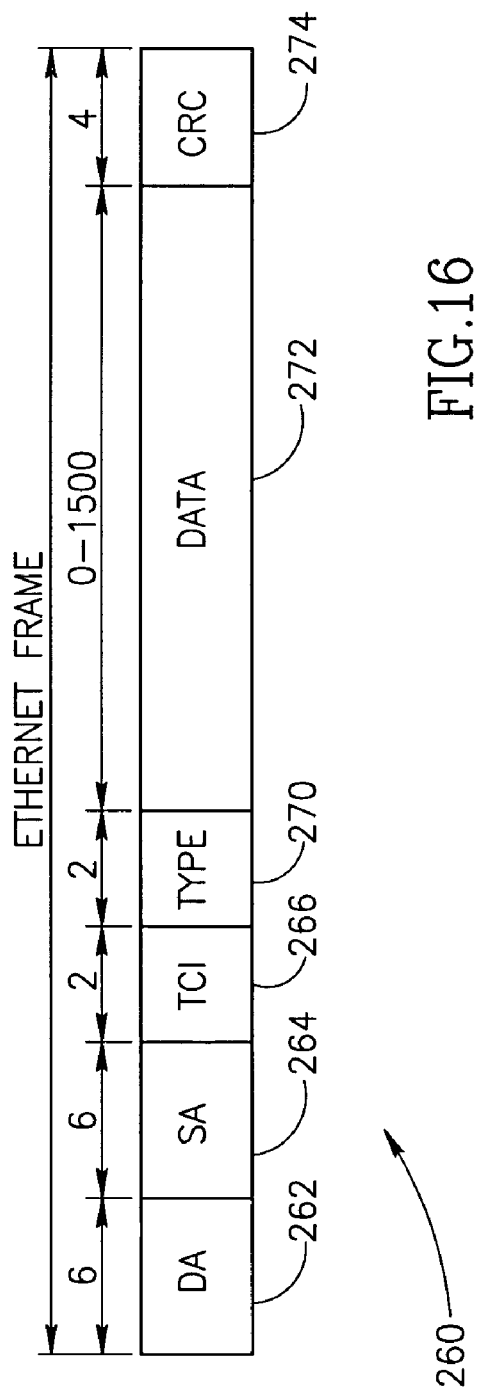
FIG. 16 is a diagram illustrating the Ethernet frame format.

A diagram illustrating the Layer 2 Ethernet frame format is shown in FIG. 16. The Ethernet frame, generally referenced 260, comprises a 6 byte destination 262, 6 byte source address 264, 2 byte Tag Control Information (TCI) field 266, 2 byte type field 270, up to 1500 data bytes 272 and a 4 byte CRC checksum 274 (referred to as a Frame Check Sequence [FCS] field). The MAC source and destination addressed identify the current and next hop switch or router, respectively. The Tag Control Information field comprises 3 bits for user-priority, 1 bit for canonical format indicator (CFI) and 12-bits for VLAN ID. The type field is equal to 0x0800 for an IP packet, 0x0806 for an ARP request or reply and 0x0835 for a RARP request or reply.

Control Frame Format

Figure 17:
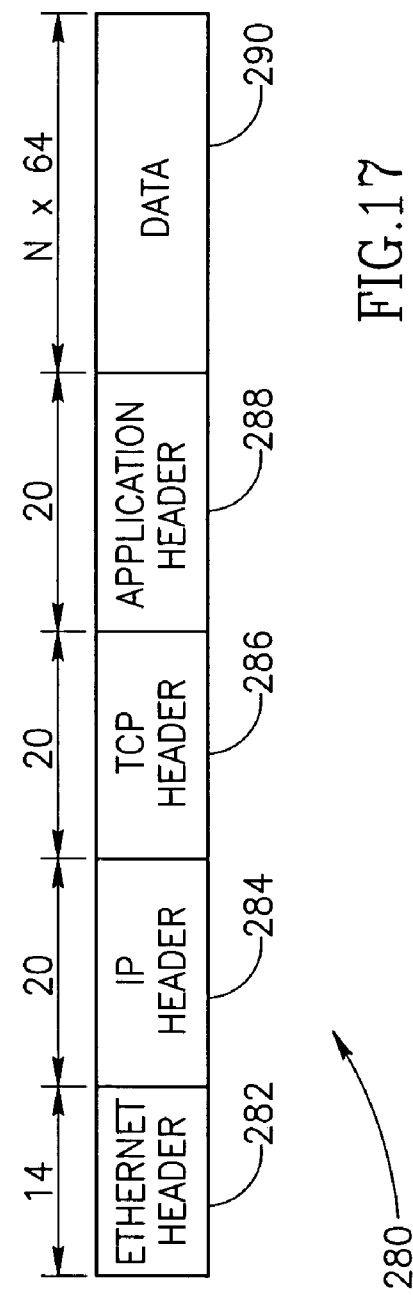
FIG. 17 is a diagram illustrating the control frame format of the present invention.

A diagram illustrating the control frame format of the present invention is shown in FIG. 17. The control frame, generally referenced 280, comprises a 14 byte Ethernet header 282, 20 byte IP header 284, 20 byte TCP header 286, 20 byte application header 288 and N×64 bytes of data 290.

Signaling, management and other control messages are processed by the CPU 352 (FIG. 9). Ingress signaling messages are transmitted through signaling channels within the PCM traffic, collected by the framer in the PHY block or by the processor 364 and forwarded to the CPU through the processor-CPU interface. Ingress management messages originated by the CPU are sent directly over the CPU-MAC interface toward the IP/Ethernet network. Egress management messages are received by the MAC device and forwarded to the CPU 352 over the PCI bus 362. Note that these messages are filtered from the processor 364. Note also that the management and signaling messages use the TCP/IP protocol as opposed to UDP/IP for data path messages.

Figure 18:
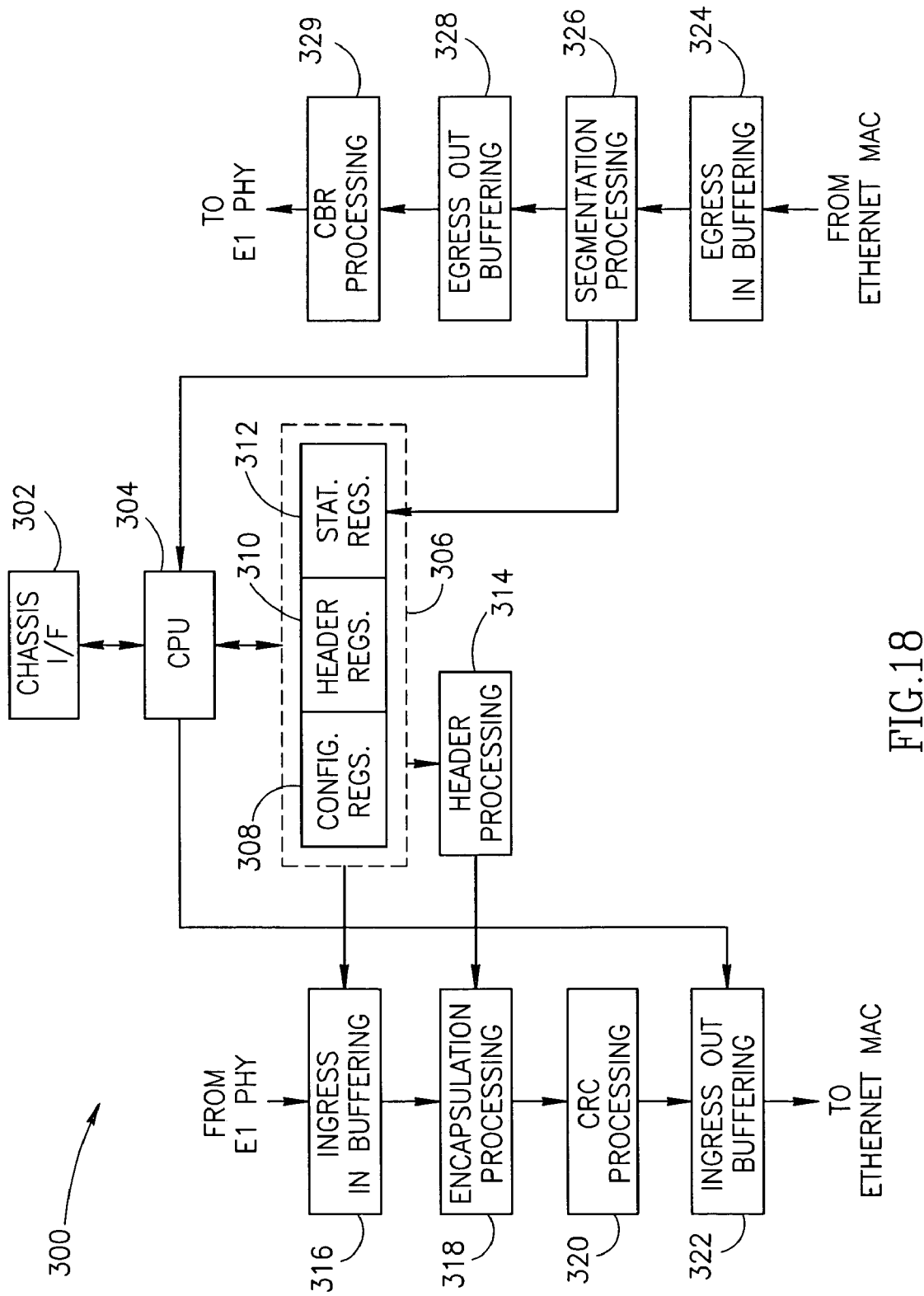
FIG. 18 is a block diagram illustrating the logical data flow of the data processing functions of the circuit emulation device of the present invention.

A block diagram illustrating the logical data flow of the data processing functions of the circuit emulation device of the present invention is shown in FIG. 18. The data flow, generally referenced 300, comprises two main paths: a path from TDM PHY to Ethernet MAC and vice versa.

The TDM bit stream data received over the TDM PHY circuit is first buffered in the Rx TDM buffer 424 (FIG. 8) (block 316). The TDM data is stored in queue based on the configuration parameters set by the CPU. Since an Ethernet frame can only have a single destination address, all the P_frames transported in an Ethernet frame must be destined for the same address. Which TDM P_frames to place in an Ethernet frame can be determined either by the TDM port number or the number of TDM frames to accumulate (i.e. the encapsulation duration). The number of frames assembled determines the resulting latency. Thus, the number of frame to include depends on the desired QoS or delay. If the destination is sensitive to delay, it is preferable to pack fewer frames and vice versa. Packing fewer frames, however, results in higher overhead. Networks with routers typically favor longer packets due to the overhead of the routing process. Note that packing multiple frames from different ports in parallel does not add latency.

The TDM P_frames are then encapsulated into E_frames (block 318). This includes the processing required to encapsulate the TDM data into RTP, UDP and IP packets and finally into Ethernet frames including the generation of the appropriate headers, e.g., RTP, UDP, etc. (block 314). The required CRC checksums are then calculated (block 320) and placed in the appropriate places in the E_frame. The E_frame is then buffered for output and forwarded to the Ethernet MAC for transmission over the attached IP/Ethernet network (block 322). The CPU 304 controls the ingress out buffering.

In the opposite direction, Ethernet frames ate received by the MAC layer and stored in the egress buffer (block 324). The received Ethernet frames are then processed. The headers are removed and the packet contents are segmented into TDM data frames (block 326). The TDM frames are then buffered in the egress out buffer (block 328). The TDM CBR streams are re-generated, re-synchronized and forwarded to the TDM. PHY blocks (block 329).

Note that the segmentation processing 326 is operative to forward control and management messages to the CPU. These messages are sent and received using the more reliable TCP protocol rather the unreliable UDP protocol which is used to transport the TDM stream data.

Various registers are read by and written to by the CPU including configuration registers 308, header registers 310 and statistics registers 312. The configuration registers hold various configuration parameters for the encapsulation and segmentation processes, e.g., the number of P_frames to pack into each Ethernet frame, etc. The segmentation processor 326 is operative to track a plurality of statistics such as number of frames received, etc.

Figure 19:
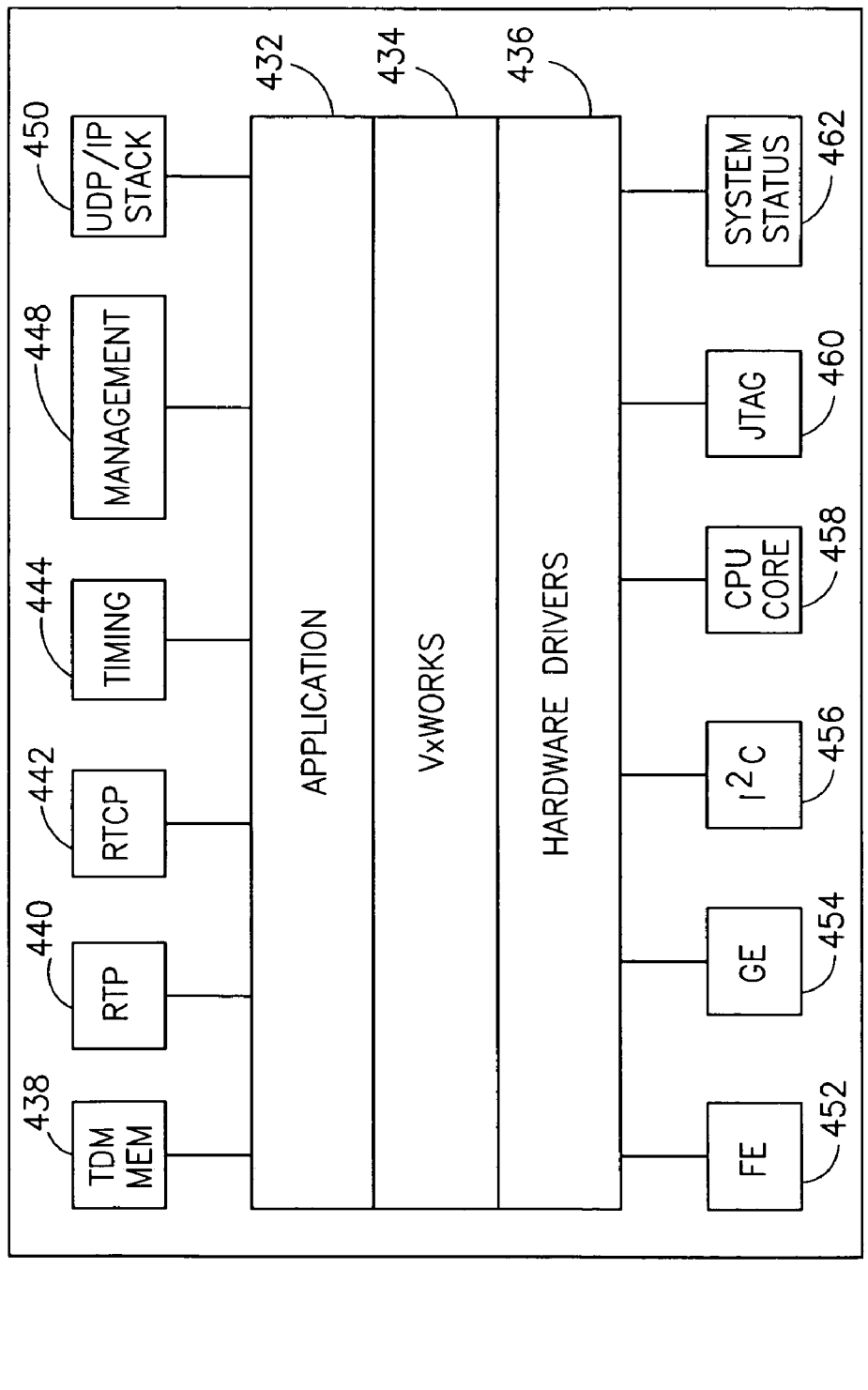
FIG. 19 is a block diagram illustrating the software architecture of the hardware circuit emulation device of the present invention.

A block diagram illustrating the software architecture of the hardware circuit emulation device of the present invention is shown in FIG. 19. The software processes, generally referenced 430, are performed by a plurality of software tasks that are executed by the CPU. The tasks include TDM memory task 438, RTP protocol processing task 441), RTCP protocol processing task 442, timing task 444, management task 448, UDP/IP protocol processing task 450, Fast Ethernet task 452, Gigabit Ethernet task 454, I²C task 456, CPU core 458, JTAG task 460 and system status task 462. In addition, the software also comprises low level hardware drivers 436, suitable operating system such as VxWorks 434 and the application layer 432.

The TDM memory process 438 includes such functions as setting the configuration registers including receive and transmit blocks, segmentation per TDM port and Ethernet ports. Setting encapsulation parameters including port and duration parameters. Debugging read and write operations from and to the TDM memory via the encapsulation/segmentation processor.

The RTP protocol task functions to provide the application layer. The UDP/IP protocol task functions to provide the transport and network layers. The UDP/IP stack adds the unreliable layer of UDP that opens a port for each session setup. The IP layer determinates the destination CED using the IP destination address field. The MAC layer tasks 452, 454 function to provide the next hop router address that will forward the packet towards the far end CED using the MAC destination address field.

The management task 448 performs several functions including fault management which is the detection of a problem, isolation of the fault and correction to normal operation. Most systems poll the managed objects, search for error conditions and illustrate the problem in either a graphic format or a textual message. Most of these types of messages are setup by the person configuring the polling on the Element Management System. Fault management involves events and traps as they occur on the network.

Another function performed by the management task is configuration management whereby changes, additions and deletions of elements as well as dynamic updating of the configuration are handled. In addition, the management task performs accounting functions on its ports: on the TDM ports in order to provide statistics and data analysis for PTT calls and on the Ethernet ports in order to provide information for debug and proper analysis of the IP based network. Other functions include providing the performance parameters such as in-system ingress and egress delays, Ethernet utilization, PRI utilization (if known), CED to CED delay, jitter parameters, etc. in response the a user setting the encapsulation parameters.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. An apparatus for transporting a plurality of Time Division Multiplexing (TDM) streams over an asynchronous Ethernet network, comprising:

an ingress buffer for storing TDM data before encapsulation into Ethernet frames;

an egress buffer for storing TDM data after received Ethernet frames are segmented;

encapsulation means for retrieving TDM data from said ingress buffer, assembling Ethernet frames therefrom, inserting therein a first timestamp related to said TDM data and forwarding said assembled Ethernet frames to an Ethernet interface;

segmentation means for receiving Ethernet frames from said Ethernet interface, extracting TDM data and a second timestamp therefrom and storing said TDM data in said egress buffer; and a processor comprising means for:
receiving TDM data from a plurality of TDM ports;
storing received TDM data in a queue within said ingress buffer wherein all TDM data to be encapsulated within an Ethernet frame is stored together; and
retrieving TDM data from said egress buffer and generating a plurality of synchronous TDM data streams therefrom.

2. The apparatus according to claim 1, wherein said plurality of TDM streams comprises streams selected from a group comprising E1, T1, E3, T3, OC-3, STM-1, OC-12, and STM-4 streams.

3. The apparatus according to claim 1, wherein said encapsulation means encapsulates data from said plurality of TDM ports into a single Ethernet frame.

4. The apparatus according to claim 1, wherein said encapsulation means encapsulates data from a plurality of TDM frames corresponding to a single TDM port into a single Ethernet frame.

5. The apparatus according to claim 1, wherein said segmentation means segments an Ethernet frame into a plurality of TDM streams, each TDM stream corresponding to a different TDM port.

6. The apparatus according to claim 1, wherein said segmentation means segments an Ethernet frame into a plurality of TDM frames corresponding to a single TDM port.

7. The apparatus according to claim 1, wherein said processor for storing TDM data received from a plurality of TDM ports in accordance with specific port based parameters.

8. The apparatus according to claim 1, wherein said processor for storing TDM data received from a plurality of TDM ports in accordance with specific time based parameters.

9. The apparatus according to claim 1, wherein said encapsulation means receives TDM data on a plurality of constant synchronous serial bit streams.

10. The apparatus according to claim 1, wherein said encapsulation means encrypts said TDM data before packaging said TDM data into Ethernet frames.

11. The apparatus according to claim 1, wherein said encapsulation means compresses said TDM data before packaging said TDM data into Ethernet frames.

12. The apparatus according to claim 1, wherein said encapsulation means calculates a Cyclic Redundancy Check (CRC) code for use in packaging said TDM data into Ethernet frames.

13. The apparatus according to claim 1, wherein said encapsulation means comprises:
  means for packaging TDM stream data into Real Time Protocol (RTP) packets, then into User Datagram Protocol (UDP) packets, then into Internet Protocol (IP) packets and finally into Ethernet frames; and
  means for generating appropriate header information for said RTP packets, UDP packets, IP packets and Ethernet frames or a subset thereof.

14. The apparatus according to claim 1, wherein said encapsulation means forwards Ethernet frames toward an Ethernet Media Access Control (MAC) device.

15. The apparatus according to claim 1, wherein said segmentation means comprises;
  means for extracting TDM stream data from the contents of a Real Time Protocol (RTP) packet, User Datagram Protocol (UDP) packet and Internet Protocol (IP) packet extracted from a received Ethernet frame; and
  means for storing said TDM data in said egress buffer in accordance with the contents of RTP header information.

16. The apparatus according to claim 1, wherein said processor for performing rate adaptation between a plurality of TDM ports and an egress buffer interface.

17. The apparatus according to claim 1, wherein said processor for forwarding TDM frames to appropriate TDM ports as a constant synchronous serial or parallel bit stream.

18. An apparatus for transporting TDM streams over an Ethernet network, comprising;
  a plurality of TDM port interfaces coupled to a plurality of TDM ports, each TDM port for receiving a constant synchronous serial or parallel TDM stream;
  at least one Ethernet interface coupled to said Ethernet network;
  encapsulation means for retrieving TDM data from an ingress buffer, assembling Ethernet frames therefrom, inserting therein a first timestamp related to said TDM data and forwarding said assembled Ethernet frames to said Ethernet interface;
  segmentation means for receiving Ethernet frames from said Ethernet interface, extracting TDM data and a second timestamp therefrom and storing said TDM data in an egress buffer; and
  a processor comprising means for:
    receiving TDM data from a plurality of TDM ports;
    storing received TDM data in a queue within said ingress buffer wherein all TDM data to be assembled within a single Ethernet frame is stored together; and
    retrieving TDM data from said egress buffer and generating a plurality of TDM data streams therefrom.

19. The apparatus according to claim 18, wherein said Ethernet interface comprises a 10Base-T Ethernet interface.

20. The apparatus according to claim 18, wherein said Ethernet interface comprises a 100Base-T Fast Ethernet interface.

21. The apparatus according to claim 18, wherein said Ethernet interface comprises a 1000Base-T Gigabit Ethernet interface.

22. The apparatus according to claim 18, wherein said Ethernet interface comprises a 10 Gigabit Ethernet interface.

23. The apparatus according to claim 18, wherein said plurality of TDM port interfaces comprises at least one port interface selected from a group comprising E1, T1, E3, T3, OC-3, STM-1, OC-12 and STM-4 port interfaces.

24. The apparatus according to claim 18, wherein said encapsulation means encapsulates data from said plurality of TDM ports into a single Ethernet frame.

25. The apparatus according to claim 18, wherein said encapsulation means encapsulates data from a plurality of TDM frames corresponding to a single TDM port into a single Ethernet frame.

26. The apparatus according to claim 18, wherein said segmentation means segments an Ethernet frame into a plurality of TDM streams, each TDM stream corresponding to a different TDM port.

27. The apparatus according to claim 18, wherein said segmentation means segments an Ethernet frame into a plurality of TDM frames corresponding to a single TDM port.

28. The apparatus according to claim 18, wherein said processor for storing TDM data received from a plurality of TDM ports in accordance with specific port based parameters.

29. The apparatus according to claim 18, wherein said processor for storing TDM data received from a plurality of TDM ports in accordance with specific lime based parameters.

30. The apparatus according to claim 18, wherein said encapsulation means comprises:
  means for packaging TDM stream data into Real Time Protocol (RTP) packets, then into User Datagram Protocol (UDP) packets, then into Internet Protocol (IP) packets and finally into Ethernet frames; and
  means for generating appropriate header information for said RTP packets, UDP packets, IP packets and Ethernet frames or any subset thereof.

31. The apparatus according to claim 18, wherein said segmentation means comprises:
  means for extracting TDM stream data from the contents of a Real Time Protocol (RTP) packet, User Datagram Protocol (UDP) packet and Internet Protocol (IP) packet extracted from a received Ethernet frame; and
  means for storing said TDM data in said egress buffer in accordance with the contents of RTP header information or any subset thereof.

32. A method of transporting a plurality of Time Division Multiplexing (TDM) streams over an Ethernet network, said method comprising the steps of:
  receiving TDM stream data from a plurality of TDM ports;
  storing received TDM stream data in a queue within an ingress buffer wherein all TDM data to be assembled into a single Ethernet frame is stored together;
  assembling Ethernet frames from received TDM stream data retrieved from said queue and inserting therein a first timestamp related to said IM stream data;
  forwarding said assembled Ethernet frames to said Ethernet network via an Ethernet interface connected thereto;
  receiving Ethernet frames from said Ethernet network;

extracting TDM data and a second timestamp from said received Ethernet frames and generating TDM streams therefrom; and forwarding said generated TDM streams to an appropriate TDM port in a synchronous manner.

33. The method according to claim 32, wherein said step of receiving TOM stream data comprises the step of storing said TDM data in an ingress buffer in accordance with an output Ethernet frame to be generated.

34. The method according to claim 32, wherein said step of extracting comprises the step of storing segmented TDM data in an egress buffer.

35. The method according to claim 32, wherein said Ethernet interface comprises a 10Base-T Ethernet interface.

36. The method according to claim 32, wherein said Ethernet interface comprises a 100Base-T Fast Ethernet interface.

37. The method according to claim 32, wherein said Ethernet interface comprises a 100Base-T Gigabit Ethernet interface.

38. The method according to claim 32, wherein said Ethernet interface comprises a 10 Gigabit Ethernet interface.

39. The method according to claim 32, wherein said plurality of TDM port interfaces comprises at least one port interface selected from a group comprising E1, T1, E3, T3, OC-3, STM-1, OC-12 AND STM-4 port interfaces.

40. The method according to claim 32, wherein said step of assembling comprises the step of encapsulating data from said plurality of TDM ports into a single Ethernet frame.

41. The method according to claim 32, wherein said step of assembling comprises the step of encapsulating data from a plurality of TDM frames corresponding to a single TDM port into a single Ethernet frame.

42. The method according to claim 32, wherein said step of extracting comprises the step of segmenting an Ethernet frame into a plurality of TDM streams, each TDM stream corresponding to a different TDM port.

43. The method according to claim 32, wherein said step of extracting comprises the step of segmenting an Ethernet frame into a plurality of TDM frames corresponding to a single TDM port.

44. The method according to claim 32, further comprising the step of storing TDM data received from a plurality of TDM ports in accordance with specific port based parameters.

45. The method according to claim 32, further comprising the step of storing TDM data received from a plurality of TDM ports in accordance with specific time based parameters.

46. The method according to claim 32, wherein said step of assembling comprises the steps of:

packaging TDM stream data into Real Time Protocol (RTP) packets, then into User Datagram Protocol (UDP) packets, then into Internet Protocol (IP) packets and finally into Ethernet frames; and generating appropriate header information for said RTP packets, UDP packets, IP packets and Ethernet frames or a subset thereof.

47. The method according to claim 32, wherein said step of extracting comprises the steps of: extracting TDM stream data from the contents of a Real Time Protocol (RTP) packet, User Datagram Protocol (UDP) packet and Internet Protocol (IP) packet extracted from a received Ethernet frame; and storing said TDM data in said egress buffer in accordance with the contents of RTP header information.

* * * * *